(12) United States Patent    (10) Patent No.:   US 12,682,785 B2
Kim et al.    (45) Date of Patent:   Jul. 14, 2026

(54) APPARATUS AND METHOD FOR OUTPUTTING INFORMATION

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 0 days.

(21) Appl. No.: 19/002,676

(22) Filed: Dec. 26, 2024

(65) Prior Publication Data

US 2025/0124813 A1   Apr. 17, 2025

Related U.S. Application Data

(63) Continuation-in-part of application No. PCT/KR2023/018721, filed on Nov. 21, 2023.

(30) Foreign Application Priority Data

Dec. 21, 2022   (KR) ........................ 10-2022-0180934
Jun. 23, 2023   (KR) ........................ 10-2023-0081214

(51) Int. Cl.
    *G09B 21/00*       (2006.01)
    *G06V 10/26*       (2022.01)
             (Continued)

(52) U.S. Cl.
    CPC .......... *G09B 21/004* (2013.01); *G06V 10/26* (2022.01); *G06V 10/751* (2022.01); *G06V 20/62* (2022.01); *G06V 30/14* (2022.01)

(58) Field of Classification Search
    CPC .... G09B 21/004; G06V 10/751; G06V 20/62; G06V 30/14; G06V 10/26
    See application file for complete search history.

(56) References Cited

U.S. PATENT DOCUMENTS

2005/0106536 A1   5/2005   Liebermann
2005/0233287 A1   10/2005   Bulatov et al.
            (Continued)

FOREIGN PATENT DOCUMENTS

KR   10-2017-0128196 A   11/2017
KR   10-2020-0109921 A   9/2020
            (Continued)

*Primary Examiner* — Robert P Bullington
(74) *Attorney, Agent, or Firm* — NKL LAW; Jae Youn Kim

(57) ABSTRACT

An apparatus and a method for outputting information are provided. The apparatus includes a first information output portion including a first information output cell arranged in a grid structure and having a preset number of first information output units for tactilely sensing in an event of upward or downward movement, a second information output portion including a second information output cell arranged in a grid structure and having a preset number of second information output units, and a processor for detecting one or more of an image and a text from content being input, generating a first driving signal driving the first information output unit based on detecting the image, transmitting the first driving signal to the first information output portion, generating a second driving signal driving the second information output unit based on detecting the text, and transmitting the second driving signal to the second information output portion.

14 Claims, 16 Drawing Sheets

(51) Int. Cl.
    *G06V 10/75*       (2022.01)
    *G06V 20/62*       (2022.01)
    *G06V 30/14*       (2022.01)

(56)         References Cited

U.S. PATENT DOCUMENTS

| | | |
|---|---|---|
| 2012/0315605 A1 | 12/2012 | Cho |
| 2019/0050057 A1 | 2/2019 | Cho et al. |
| 2020/0090547 A1 | 3/2020 | Kim et al. |
| 2021/0295739 A1* | 9/2021 | Moon ...................... G06F 3/02 |

FOREIGN PATENT DOCUMENTS

| | | |
|---|---|---|
| KR | 10-2021-0031660 A | 3/2021 |
| KR | 10-2349576 B1 | 1/2022 |
| KR | 10-2022-0114862 A | 8/2022 |
| WO | 2014/014175 A1 | 1/2014 |

* cited by examiner

APPARATUS AND METHOD FOR OUTPUTTING INFORMATION

TECHNICAL FIELD

The present disclosure relates to an information output apparatus and method, which output an image and text detected from content to be tactilely sensed.

BACKGROUND ART

Users may recognize information in various ways. For this end, various types of information output apparatuses have been used. For example, visual information output apparatuses using printed materials, auditory information output apparatuses through sounds, tactile information output apparatuses through Braille, and the like have been used.

Meanwhile, as tactile information output apparatuses through Braille deliver information by outputting only characters, information that may be recognized by visually impaired people is limited, and various types of content to be recognized may not be particularly identified.

Therefore, there is a need for an information output apparatus, which processes and outputs various types of content such as an image, text, a graph, a diagram, and an equation to enable visually impaired people to easily recognize various types of information.

DISCLOSURE

Technical Problems

An object of the present disclosure is to provide an information output apparatus and method, which enable particular information regarding various types of content to be easily recognized through tactile sensation by controlling first and second information output portions that may tactilely sense according to the result of detecting an image and a text from input content to display the image on the first information output portion and display the text on the second information output portion.

An object of the present disclosure is to provide an information output apparatus and method, which enable a feature of a key subject (object) within an image to be intuitively recognized through tactile sensation by performing image processing (e.g., semantic rendering processing, binarized image generation) on the image detected from content and controlling a first information output portion on the basis of the result of performing the image processing to display the feature of the key subject within the image on the first information output portion.

An object of the present disclosure is to provide an information output apparatus and method, which easily control a first information output unit formed to tactilely sense in the event of upward movement or downward movement to allow a key subject within an image to be output to a first information output portion by displaying a flag in at least one unit cell from among unit cells of a set size on the basis of the key subject within the image to generate a matching image for an output of the key subject and generating a driving signal for the first information output unit on the basis of the flag displayed in the matching image.

An object of the present disclosure is to provide an information output apparatus and method, which enable a key subject of an image to be accurately displayed even in the case where the image within content is distorted or partially unclear by detecting, from a memory, a reference key subject corresponding to the key subject of the image detected from the content and controlling a first information output unit on the basis of the reference key subject.

The problems to be solved by the present disclosure are not limited to the problems mentioned above, and other problems and advantages of the present disclosure that are not mentioned may be understood by the following description and will be more clearly understood by embodiments of the present disclosure. In addition, it will be appreciated that the problems and advantages to be solved by the present disclosure may be implemented by means and combinations thereof defined in claims.

Technical Solutions

An information output apparatus according to the present embodiment may include a first information output portion including a first information output cell which is arranged in a grid structure and includes a preset number of first information output units configured to tactilely sense in an event of upward movement or downward movement in at least one direction, a second information output portion provided at a different location from the first information output portion and including a second information output cell which is arranged in a grid structure and includes a preset number of second information output units, and a processor configured to detect one or more of an image and a text from content being input, generate a first driving signal driving the first information output unit according to a result of detecting the image, transmit the first driving signal to the first information output portion, generate a second driving signal driving the second information output unit according to a result of detecting the text, and transmit the second driving signal to the second information output portion.

An information output method according to the present embodiment is performed by a processor of an information output apparatus and includes detecting one or more of an image and a text from content being input, generating a first driving signal driving a first information output unit according to a result of detecting the image and transmitting the first driving signal to a first information output portion, and generating a second driving signal driving a second information output unit according to a result of detecting the text and transmitting the second driving signal to a second information output portion, wherein the first information output portion includes a first information output cell which is arranged in a grid structure and includes a preset number of first information output units configured to tactilely sense in an event of upward movement or downward movement in at least one direction, and the second information output portion is provided at a different location from the first information output portion and includes a second information output cell which is arranged in a grid structure and includes a preset number of second information output units.

In addition, another method for implementing the present disclosure, another system, and a computer-readable recording medium that stores a computer program for executing the method may be further provided.

Other aspects, features, and advantages other than those described above will become apparent from the following drawings, claims, and detailed description of the disclosure.

Advantageous Effects

According to the present disclosure, provided may be an information output apparatus and method, which enable particular information regarding various types of content to be easily recognized tactilely by controlling first and second information output portions that may tactilely sense according to the result of detecting an image and a text from input content to display the image on the first information output portion and display the text on the second information output portion.

According to the present disclosure, a feature of a key subject within an image may be enabled to be intuitively recognized through tactile sensation by performing an image processing process (e.g., semantic rendering processing, binarized image generation) on the image detected from content and controlling a first information output portion on the basis of the result of performing the image processing process to display the feature of the key subject within the image on the first information output portion.

According to the present disclosure, a first information output unit formed to tactilely sense in the event of upward movement or downward movement may be easily controlled to output a key subject within an image to a first information output portion by displaying a flag in at least one unit cell from among unit cells of a set size on the basis of the key subject within the image to generate a matching image for an output of the key subject and generate a driving signal for the first information output unit on the basis of the flag displayed in the matching image.

According to the present disclosure, a key subject of an image may be accurately displayed even in the case where the image within content is distorted or partially unclear by detecting, from a memory, a reference key subject corresponding to the key subject of the image detected from the content and controlling a first information output portion on the basis of the reference key subject.

The effects of the present disclosure are not limited to those mentioned above, and other effects not mentioned may be clearly understood by those skilled in the art from the description below.

BEST MODE

Figure 1:
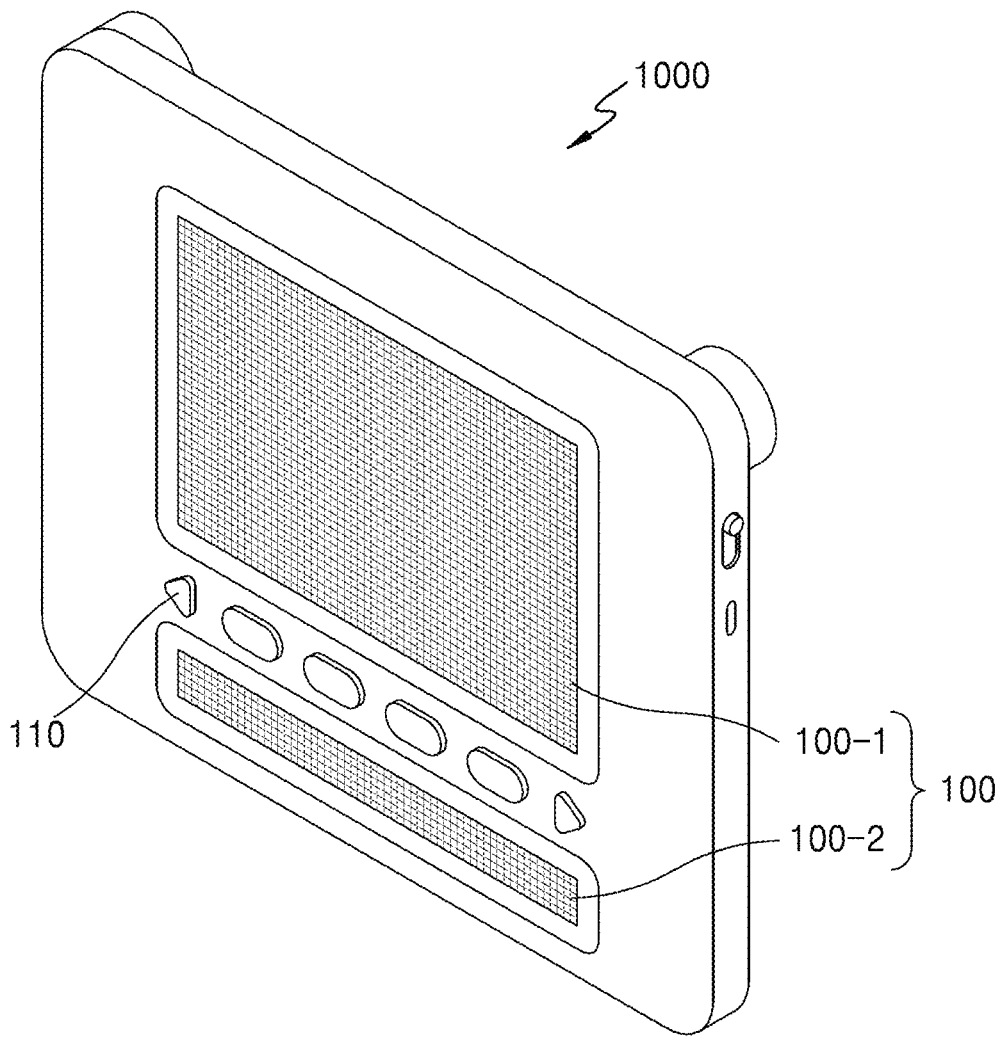
FIG. 1 is a view schematically illustrating the appearance of an information output apparatus according to the present embodiment.

Advantages and features of the present disclosure, and methods of achieving the same will become apparent with reference to embodiments described in detail in conjunction with the accompanying drawings. However, it should be understood that the present disclosure is not limited to embodiments presented below, but may be implemented in various different forms, and includes all modifications, equivalents, and alternatives included in the spirit and scope of the present disclosure. The embodiments presented below are provided to ensure that the present disclosure is complete and to fully inform those skilled in the art of the scope of the disclosure. When describing the present disclosure, the detailed description of related known arts, which may obscure the subject matter of the present disclosure, is omitted.

Terms used herein are only used to describe particular embodiments, and are not intended to limit the present disclosure. The singular forms are intended to include the plural forms as well, unless the context clearly indicates otherwise. It should be understood that the terms "comprise", "have", etc. when used herein, specify the presence of stated features, integers, steps, operations, elements, components, and/or combinations thereof, but do not preclude the presence or addition of one or more other features, integers, steps, operations, elements, components, and/or combinations thereof. The terms first, second, etc. may be used to describe various components, but the components should not be limited by these terms. The terms are used only to distinguish one component from another component.

In addition, in the present application, a "portion" may be a hardware component such as a processor or a circuit, and/or a software component executed by a hardware component such as a processor.

Hereinafter, embodiments according to the present disclosure will be described in detail with reference to the attached drawings and, when describing with reference to the attached drawings, the same or corresponding components are assigned the same reference numerals and the same descriptions thereof are omitted.

In the following embodiments, the terms first, second, etc. are used to distinguish one component from another component, not in a limited sense.

In the following embodiments, the singular form includes the plural form unless the context clearly indicates otherwise.

In the following embodiments, the terms such as include or have specify the presence of stated features or components, but do not preclude the addition of one or more other features or components.

In the case where some embodiments may be implemented differently, a particular process order may be performed differently from the order described. For example, two processes described in succession may be performed substantially simultaneously, and may be performed in the opposite order to the described order.

FIG. 1 is a view schematically illustrating the appearance of an information output apparatus according to the present embodiment.

Referring to FIG. 1, an information output apparatus 1000 may include an information output portions 100 and a plurality of user interfaces (UIs) 110. In the present embodiment, the information output portion 100 may include first information output portion 100-1 and second information output portion 100-2.

Figure 2:
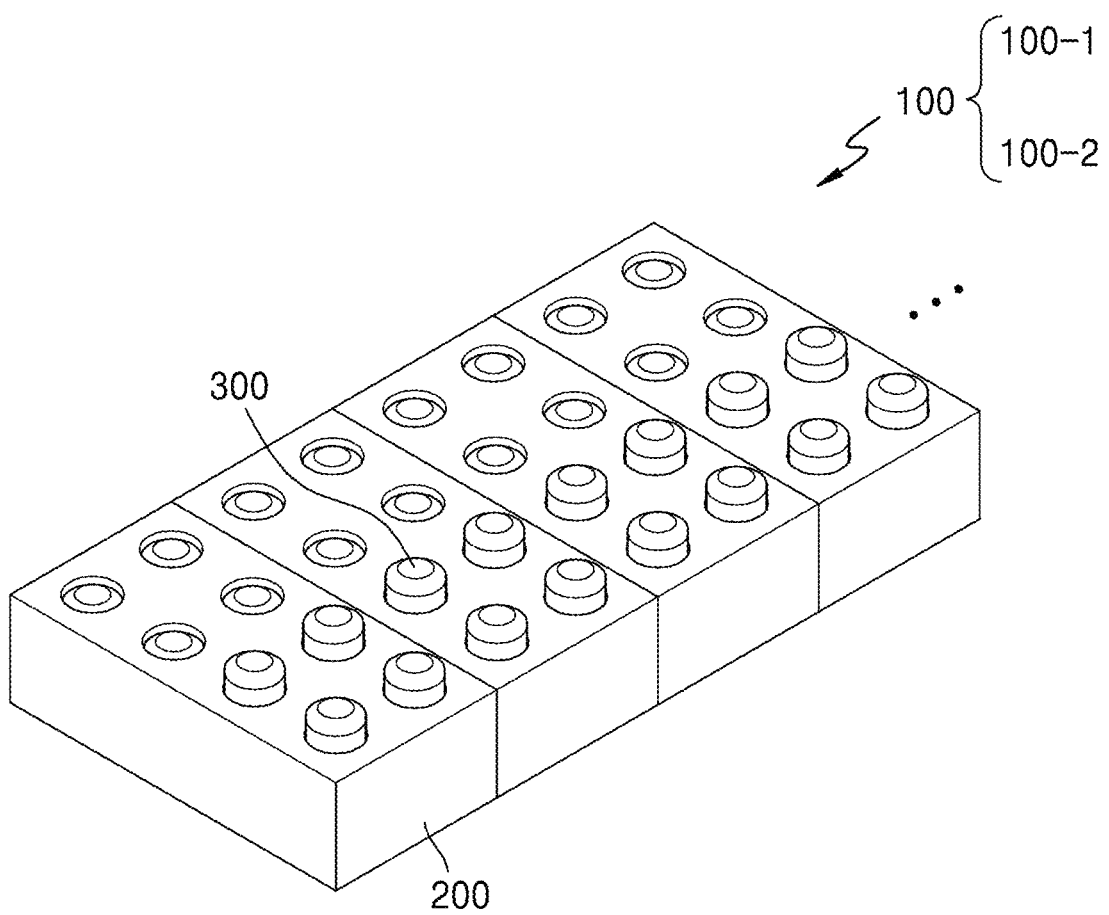
FIG. 2 is a view illustrating operations of information output cells included in first and second information output portions of FIG. 1.
Figure 3:
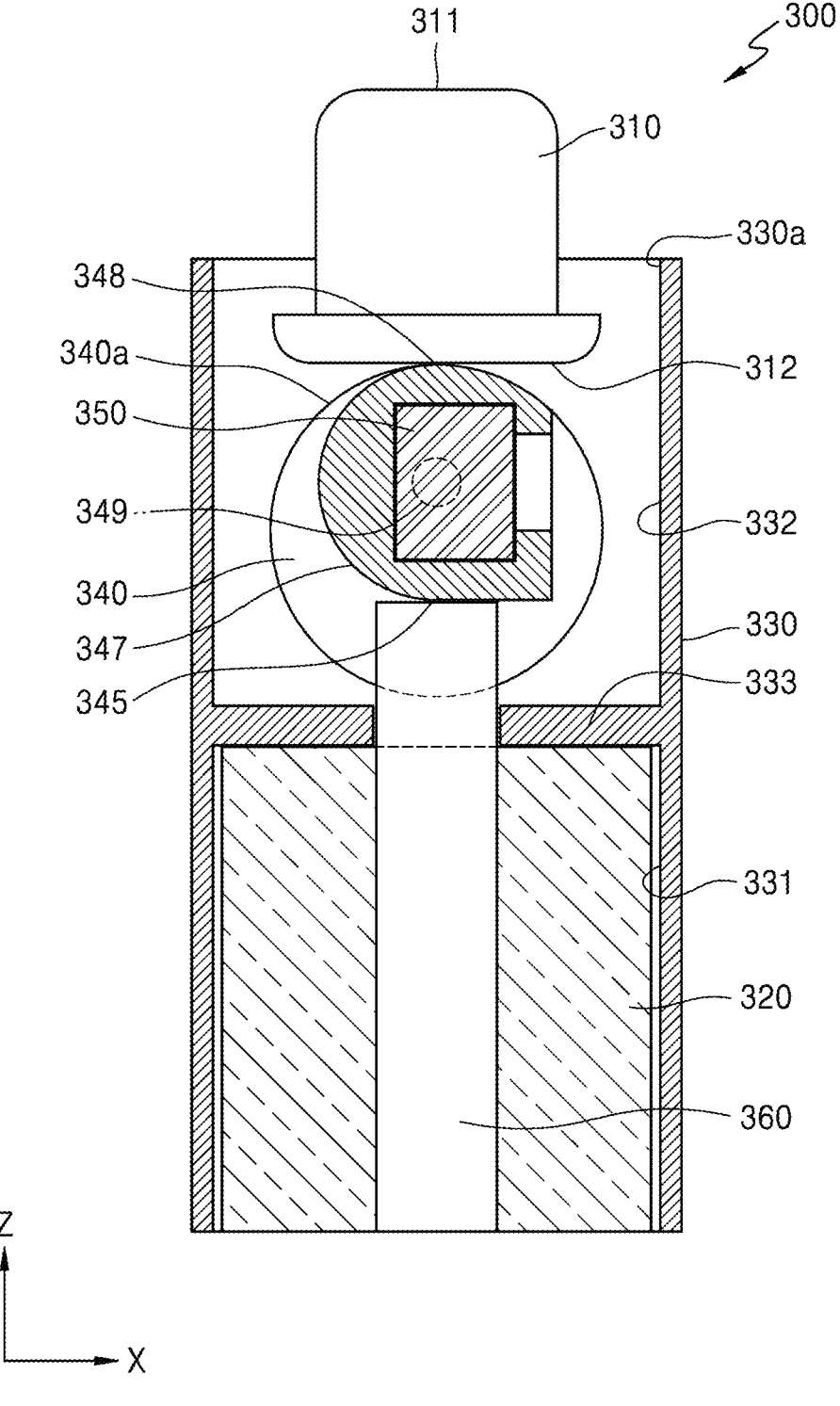
FIGS. 3 to 5 are views illustrating an operation of an information output unit included in an information output cell of FIG. 2.

The first information output portion 100-1 and the second information output portion 100-2 may include a plurality of information output units 300 of FIGS. 2 and 3 and may output certain information (e.g., an image or text, or an image and text) in Braille form. For example, the first information output portion 100-1 may output an image in a Braille form, but is not limited thereto. In addition, the second information output portion 100-2 provided at a different location from the first information output portion 100-1 may output text in a Braille form, but is not limited thereto.

In the present embodiment, a size of the first information output portion 100-1 is configured to be greater than a size of the second information output portion 100-2 and thus facilitates an output of an image having a relatively greater size than text.

The plurality of user interfaces 110 may include a manipulation portion that manipulates the information output apparatus 1000. The manipulation portion may be configured in a sensor, button, or switch structure capable of recognizing a touch or press manipulation by a user. In the present embodiment, the manipulation portion may transmit, to a controller 450 of FIG. 6, a manipulation signal manipulated by the user to check or change various types of information related to driving of the information output units 300 included in the first and second information output portions 100-1 and 100-2.

FIG. 2 is a view illustrating operations of information output cells included in first and second information output portions of FIG. 1. In the following description, the description of the same portion as the description of FIG. 1 is omitted.

Referring to FIG. 2, each of first and second information output portions 100-1 and 100-2 may include a plurality of information output cells 200 (200_1 to 200_N). Here, the first and second information output portions 100-1 and 100-2 have different sizes and may include different numbers of information output cells. For example, the size of the first information output portion 100-1 may be formed to be greater than the size of the second information output portion 100-2. Accordingly, the number of information output cells within the first information output portion 100-1 may be greater than the number of information output cells within the second information output portion 100-2. As an embodiment, the first information output portion 100-1 may include a total of 300 information output cells 200 corresponding to 30×10, and the second information output portion 100-2 may include a total of 100 information output cells 200 corresponding to 10×10, but are not limited thereto and each may include more information output cells 200 than the same.

Braille information that is output to the first and second information output portions 100-1 and 100-2 may be output in units of the information output cells 200 including the information output units 300 arranged in four rows and two columns, and when applied to the present embodiment, the information output cell 200 may include eight information output units 300.

In the present embodiment, one information output cell 200 is limited as including eight information output units 300, but is not limited thereto, one information output cell 200 may include two to eight information output units 300, and in some cases, may include more information output units 300.

Figure 4:
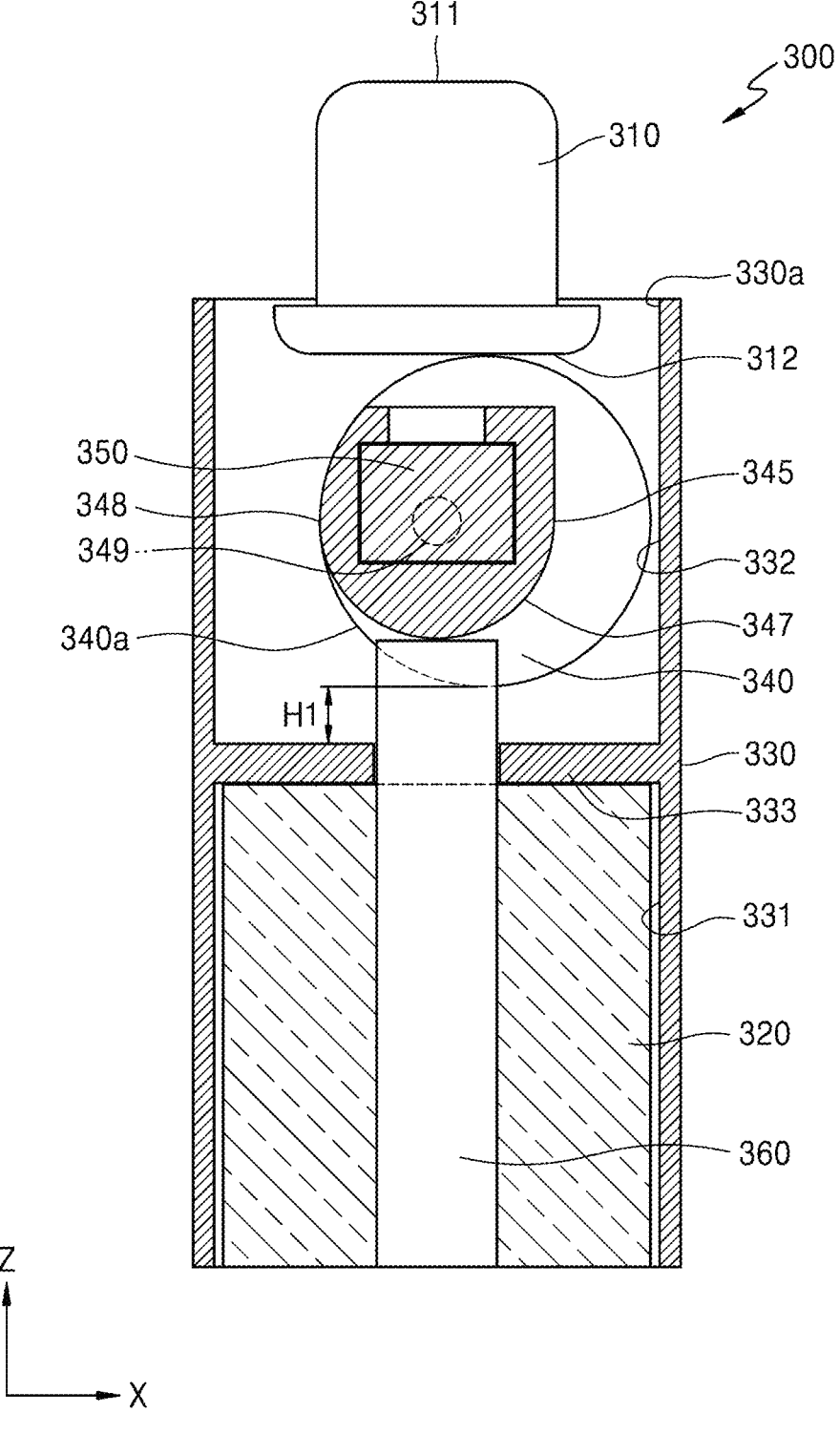
Figure 5:
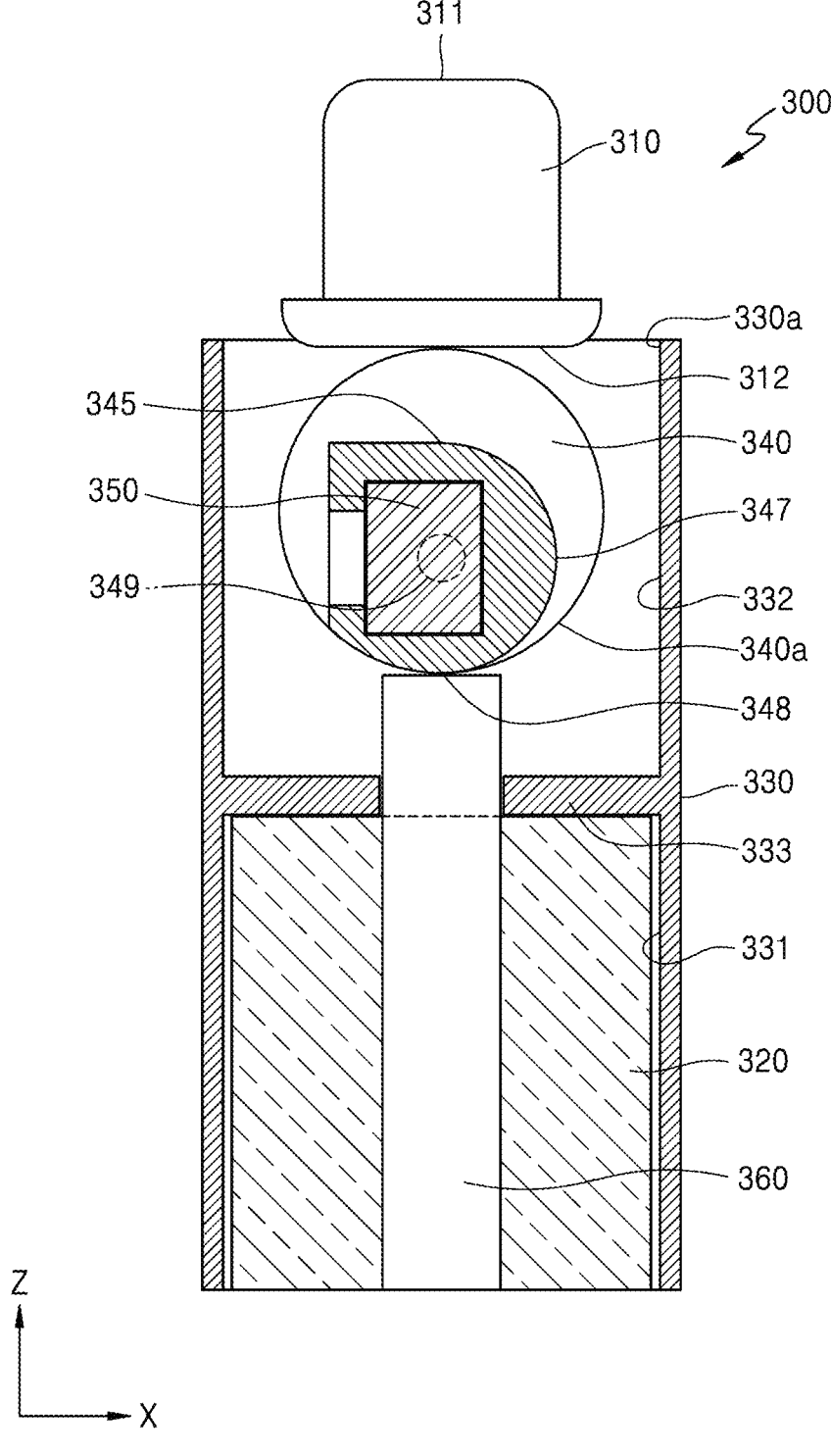

FIGS. 3 to 5 are views illustrating an operation of an information output unit included in an information output cell of FIG. 2. In the following description, the description of the same portion as the description of FIGS. 1 and 2 is omitted. Referring to FIGS. 3 to 5, the first and second information output portions 100-1 and 100-2 of the present embodiment may include at least one information output cell 200, and the information output cell 200 may include a plurality of information output units 300 (e.g., eight in four rows and two columns).

The information output unit 300 may include a coil portion 320, a base portion 330, a driving portion 340, and an expression member 310.

The expression member 310 may move according to movement of the driving portion 340 described below, and may move a location upwards and downwards at least on the basis of a longitudinal direction of the expression member 310. For example, the expression member 310 may move in one direction towards the coil portion 320 and in a direction opposite thereto.

Accordingly, the expression member 310 may move to protrude in one direction, and a user may tactilely or visually sense the movement of the expression member 310.

The representation member 310 may include an expression surface 311 and a support surface 312.

The support surface 312 may be a surface facing the driving portion 340 from among areas of the expression member 310, form a lower area of the expression member 310, and contact the driving portion 340, and the driving portion 340 may transmit a force to the expression member 310 through the support surface 312. For example, a driving surface 340a of the driving portion 340 may be in contact with the support surface 312 and move the support surface 312 in a first direction, i.e., in a Z-axis direction on the basis of FIG. 5.

The expression surface 311 is an outermost area, e.g., a farthest area from the coil portion 320, from among the areas of the expression member 310 and may include an area recognized by the user.

For example, the user may recognize the entire area of the expression member 310, but may recognize only the expression surface 311. For example, the user may sense the movement of the expression member 310 through the contact of the expression surface 311, and the user may also easily sense the movement of the expression member 310 through visual sensing of the expression surface 311.

As an optional embodiment, the expression surface 311 may include a curved surface.

The expression member 310 may have various shapes, and may include a pillar-shaped area, e.g., may include an area having a shape similar to a cylinder.

In addition, as an optional embodiment, a protruding area of the expression member 310 may have a curved surface, and corners may have curved surfaces.

The expression member 310 may include various materials, and may be formed of an insulating material as a light and durable material. For example, the expression member 310 may include a resin-based organic material. As another example, the expression member 310 may include an inorganic material such as a ceramic material.

In addition, as another selective embodiment, the expression member 310 may also be formed of a material such as metal or glass.

The coil portion 320 may be formed to be connected to an external power source (not shown). When a current flows through the coil portion 320, a magnetic field may be formed around the coil portion 320.

The coil portion 320 may have various shapes, e.g., the coil portion 320 may have a shape in which electric wires are wound a plurality of times, and the number of times being wound or the like may be variously controlled.

The driving portion 340 may move through the magnetic field generated by the current flowing through the coil portion 320, and a driving force of the movement of the expression member 310 may be provided through the movement of the driving portion 340 described above.

As an optional embodiment, a support portion 360 may be further arranged, and at least one area of the support unit 360 may be arranged to be adjacent to or support the coil portion 320.

For example, the support portion 360 may include an elongated area and may be arranged to pass through the coil portion 320, and as a particular example, a plurality of coils of the coil portion 320 may be wound around the support portion 360.

As an optional embodiment, one end of the support portion 360 may be elongated to support the driving portion 340 described below, and the movement of the driving portion 340 may be performed while being supported by the one end of the support portion 360.

As an optional embodiment, the support portion 360 may be formed to correspond to a through hole portion (not shown) of the base portion 330.

As an optional embodiment, the support portion 360 may include a magnetic substance, and as a particular example, an extension member (not shown) may contain a magnetic substance. Accordingly, when the magnetic field is generated through the coil portion 320, a magnitude of the magnetic field may increase, and power consumption of the information output portion 100 may be reduced by efficiently generating the magnetic field.

The base portion 330 may be formed to accommodate the coil portion 320. For example, the base portion 330 may include a first accommodation portion 331 and a second accommodation portion 332.

The first accommodation portion 331 and the second accommodation portion 332 may be arranged adjacent to each other or may be arranged not to overlap each other.

As an optional embodiment, the first accommodation portion 331 and the second accommodation portion 332 may be spaced apart from each other.

As another selective embodiment, the first accommodation portion 331 and the second accommodation portion 332 may be connected to each other via a through hole.

The coil portion 320 may be arranged in the first accommodation portion 331. As an optional embodiment, the support portion 360 described above may be arranged in the first accommodation portion 331, and one area of the support portion 360 may be extended and arranged even into the second accommodation portion 332 through the through hole.

Although not illustrated, as an optional embodiment, a driving groove (not shown) may be formed in the second accommodation portion 332 of the base portion 330. For example, the driving groove (not shown) may be formed in both sides of an internal surface of the second accommodation portion 332 of the base portion 330, which face each other, and as an optional embodiment, may have a shape extending in one direction, e.g., in a direction away from the coil portion 320.

The base portion 330 may have a shape elongated to accommodate the coil portion 320 and the driving portion 340, and may be formed to entirely surround both the coil portion 320 and the driving portion 340.

As an optional embodiment, the base portion 330 may include a boundary portion 333 between the first accommodation portion 331 and the second accommodation portion 332.

The first accommodation portion 331 and the second accommodation portion 332 may be separated from each other through the boundary portion 333.

As an optional embodiment, the through hole may be formed in the boundary portion 333 and may be arranged so that one area of the support portion 360 may extend and pass through the through hole.

In addition, the base portion 330 may include an inlet portion 330a, and the inlet portion 330a may be connected to the second accommodation portion 332. Through the inlet portion 330a, the expression member 310 may move so that a length thereof protruding to the outside of the base portion 330 changes.

The driving portion 340 may be arranged in the base portion 330. The driving portion 340 may be arranged in the second accommodation portion 332 and may be spaced apart from the coil portion 320 arranged in the first accommodation portion 331.

The driving portion 340 may be arranged adjacent to the coil portion 320 and may be driven by the current flowing through the coil portion 320 to perform angular movement or rotational movement. Through the driving portion 340, the expression member 310 may perform upward movement and downward movement, e.g., in one direction towards the coil portion 320 and in the direction opposite thereto.

As an optional embodiment, a magnetic force portion 350 may be arranged in the driving unit 340, e.g., in an internal space. For example, the magnetic force portion 350 may contain a magnetic force material, e.g., may include a permanent magnet.

The magnetic force portion 350 may have a first area (e.g., an N pole or an S pole) and a second area (e.g., an S pole or an N pole) having different polarities, and the first area and the second area having different polarities may be arranged in a direction from the coil portion 320 towards the expression member 310 at one point during rotation of the driving portion 340, e.g., in the Z-axis direction.

For example, on the basis of FIG. 5, the first area and the second area of the magnetic force portion 350 having different polarities may be arranged in the direction from the coil portion 320 towards the expression member 310, e.g., in the Z-axis direction.

The driving portion 340 includes the driving surface 340a at least on an outer surface thereof, and the driving surface 340a may be formed to support the expression member 310 and may provide a driving force for the upward movement and the downward movement of the expression member 310.

As an optional embodiment, the driving surface 340a of the driving portion 340 may be an outer surface and include a curved surface. As a more particular embodiment, the driving surface 340a of the driving portion 340 may include a boundary line having a shape similar to a circle.

The driving portion 340 may include a driving controller 349.

A driving location of the driving portion 340 may be controlled through the driving controller 349. For example, when the driving unit 340 moves by the coil unit 320, the driving portion 340 may perform angular movement or rotational movement on the basis of the driving controller 349.

As an optional embodiment, a central axis of the driving portion 340 and the driving controller 349 may not match each other and may be eccentric.

In addition, as an optional embodiment, the magnetic force portion 350 may not match the central axis of the driving portion 340, e.g., may be arranged to overlap one area of the driving controller 349.

Accordingly, torque with respect to the driving portion 340 may be easily generated, and the driving portion 340 may be allowed to perform angular movement or rotational movement, and thus, the movement of the expression member 310 may be efficiently performed and precise expression power of the information output portion 100 may be improved. Also, power consumption of the information output portion 100 may be reduced.

Although not illustrated, the driving portion 340 may include a first driving member (not shown) and a second driving member (not shown), and may include a spaced space (not shown) therebetween.

At least one surface of outer surfaces of the first driving member (not shown) and the second driving member (not shown) may include the driving surface 340*a* to support the expression member 310 when the driving portion 340 moves and thus provide a driving force to the expression member 310. For example, an outer boundary line (e.g., a circle) of the driving portion 340 including the driving surface 340*a* illustrated in FIG. 5 may be a boundary line of the first driving member (not shown) or the second driving member (not shown).

The outer surfaces of the selective first driving member (not shown) and second driving member (not shown) may include a curved surface, e.g., the driving surface 340*a* may include a curved surface.

For example, the first driving member (not shown) and the second driving member (not shown) may have a similar shape to a rotating body or may each have a similar shape to a disk.

Accordingly, in the event of rotational or angular movement of the first driving member (not shown) and the second driving member (not shown), a natural driving force may be provided to the support surface 312 of the expression member 310 to allow the expression member 310 to efficiently perform continuous and natural movement.

The driving controller 349 may be arranged on at least one side surface of the driving portion 340, e.g., both side surfaces.

As an optional embodiment, the driving controller 349 may have a protruding shape, i.e., may protrude in a direction away from the side surface of the driving portion 340 (in a direction protruding in the drawing on the basis of FIG. 5), and as an optional embodiment, the protruding shape of the driving controller 349 may correspond to the driving groove (not shown) when the base unit 330 includes the driving groove.

For example, the driving portion 340 may move by the magnetic field by the coil unit 320, and as a particular example, may perform upward movement and downward movement due to a repulsive force and an attractive force acting on the magnetic force portion 350 within the driving portion 340. Here, the driving portion 340 may perform upward movement and downward movement while performing the rotational movement around the driving controller 349.

As an optional embodiment, the driving portion 340 may move while the driving controller 349 of the driving portion 340 is arranged in one area of the base portion 330, e.g., in the driving groove (not shown) of the second accommodation portion 332.

A first movement area 345 and a second movement area 348 may be arranged in the spaced space between the first driving member (not shown) and the second driving member (not shown).

The first movement area 345 and the second movement area 348 may be areas that are respectively bases of the lowest point and the highest point in the event of movement of the driving portion 340.

As an optional embodiment, a connection area 347 may be arranged between the first movement area 345 and the second movement area 348, and the connection area 347 may include a curved surface.

For example, as shown in FIG. 5, when the first movement area 345 is arranged at the lowermost portion, i.e., in an area closest to the coil portion 320, the driving portion 340 is placed at the lowest point, and accordingly, the expression member 310 may also be at the lowest point, in detail, a height of the expression member 310 protruding from the base portion 330 may be the smallest. Here, the first movement area 345 may be supported by an upper end of the support portion 360.

Subsequently, as illustrated in FIG. 4, in the case where a current is applied to the coil portion 320 and thus a magnetic field is formed, the driving portion 340 may move, e.g., in the case where a repulsive force acts on the magnetic force portion 350 arranged in the driving portion 340, one end portion of the magnetic force portion 350 (a polar side on which the repulsive force acts) may be arranged to be away from a direction of the magnetic field and thus the connection area 347 may be supported by the upper end of the support portion 360. Referring to FIG. 4, the driving portion 340 rises, i.e., an uppermost surface of the driving portion 340 rises, and accordingly, the expression member 310 may also slightly rise and referring to FIG. 4, may rise by a height of H1.

As an optional embodiment, the driving portion 340 performs rotational movement on the basis of the driving controller 349, and thus, the driving controller 349 may maintain a location.

Subsequently, as illustrated in FIG. 5, in the case where a current is applied to the coil portion 320 of FIG. 4 and thus a magnetic field is maintained formed, the driving portion 340 may continuously move, e.g., from among an area of the magnetic force portion 350 arranged in the driving portion 340, one end portion of the magnetic force portion 350 on which an attractive force acts according to the generated magnetic field may be arranged close to the coil portion 320, and thus, the second movement area 348 may be supported by the upper end of the support unit 360. Referring to FIG. 5, the driving portion 340 rises, i.e., the uppermost surface of the driving portion 340 rises, and accordingly, the expression member 310 may also rise, and the state of FIG. 5 may be an uppermost rise point of the expression member 310.

As an optional embodiment, the driving portion 340 performs the rotational movement on the basis of the driving controller 349, and thus, the driving controller 349 may maintain the location.

As an optional embodiment, movement from the state of FIG. 4 to the state of FIG. 5 may be continuous. The state of FIG. 4 is to describe one process, and when the state of FIG. 5 is changed to the state of FIG. 4, the driving portion 340 and the expression member 310 may continuously move in the state of FIG. 4 without stopping and change to the state of FIG. 5.

For example, FIG. 3 and FIG. 5 illustrate that the expression member 310 may maintain stopping, and FIG. 4 may illustrate that the expression member 310 is during movement.

As an optional embodiment, a sequential movement process of FIG. 5 may also be applied to an embodiment described below.

In the event of the rotational movement of the driving portion 340, the support portion 360 may support at least one area of the connection area 347 before supporting the first movement area 345 and then supporting the second movement area 348, and accordingly, the driving portion 340 may naturally move and thus may also precisely control the movement of the expression member 310.

A distance between the driving surface 340a and the first movement area 345 may be different from a distance between the driving surface 340a and the second movement area 348. For example, the distance between the driving surface 340a and the first movement area 345 may be greater than the distance between the driving surface 340a and the second movement area 348.

As an optional embodiment, a distance from a central axis of a shape of the driving portion 340 to the first movement area 345 may be less than a distance from the central axis of the shape of the driving portion 340 to the second movement area 348.

As an optional embodiment, a distance from the driving controller 349 to the first movement area 345 may be the same as or similar to a distance from the driving controller 349 to the second movement area 348, and as an additional selective embodiment, may also be the same as or similar to a distance from the driving controller 349 to the connection area 347.

For example, the connection area 347 may correspond to at least one area of a circumference having a radius around of a central point of the driving controller 349, and the first movement area 345 and the second movement area 348 may respectively have flat surface shapes extending parallel to each other in areas that face each other and correspond to a diameter.

Accordingly, in the case where the support portion 360 supports the first movement area 345, the second movement area 348, and the connection are 347 when the driving portion 340 performs the rotational movement around the driving controller 349, the location of the driving controller 349 may be maintained the same or similar.

In addition, when supported by the support portion 360, the connection area 347 supported by the support portion 360 may include a surface close to a curved surface or an arc to enable smooth and soft movement of the driving portion 340 to be efficiently performed.

Although not illustrated, the second accommodation portion 332 of the base portion 330 may include a groove having at least a greater shape than the driving controller 349 to accommodate the driving controller 349.

The above description describes the case where the first movement area 345, the second movement area 348, and the connection area 347 are arranged in an area including the driving surface 340a of the driving portion 340, e.g., in the spaced space between the first driving member (not shown)

and the second driving member (not shown). Also, the above description also applied to embodiments described below.

As another selective embodiment, the first movement area 345, the second movement area 348, and the connection area 347 may be arranged in the area including the driving surface 340a of the driving portion 340, e.g., on the outer surface of the first driving member (not shown) or the second driving member (not shown).

In addition, as another selective embodiment, the second movement area 348, and the connection area 347 may also be arranged in the area including the driving surface 340a of the driving unit 340, e.g., on both side surfaces of one of the first driving member (not shown) or the second driving member (not shown), and accordingly, the driving controller 349 may be arranged in an area including the first movement area 345, the second movement area 348, and the connection area 347.

In addition, various selective embodiments described above may include the case where a structure having the first movement area 345, the second movement area 348, and the connection area 347 in the area including the driving surface 340a, e.g., on an outer surface of a shape having a smaller size than the first driving member (not shown) or the second driving member (not shown), include variously modified structures.

In the present embodiment, the driving portion 340 of the information output unit 300 may move in at least a first direction or in a direction opposite thereto, and the expression member 310 may also move in the first direction or in the direction opposite thereto according to the movement of the driving portion 340 to output various types of information that may be sensed by the user.

For example, the information output unit 300 of the present embodiment may be a unit for outputting information according to the user sensing a surface of the expression member 310 through tactile sensation when the expression member 310 protrudes. More particularly, the output of the information may be, for example, information output in the form of a Braille output.

As an optional embodiment, the information output unit 300 may be a visual sensing type information output unit according to the user visually sensing the same when the expression member 310 protrudes. In particular, here, in the case where a color is formed on one surface of the expression member 310, e.g., on an upper surface, or is formed to generate light on one surface of the expression member 310, a visual effect may be increased.

Accordingly, the information output unit 300 of the present embodiment may output information to the user.

In addition, in detail, the driving portion 340 may easily move in the first direction, e.g., rise, by the magnetic field by the coil portion 320, and may move by performing the rotational movement while maintaining a certain area by the driving controller 349.

For example, in the case where a repulsive force is generated by the magnetic field generated by the coil portion 320 according to a polarity of the magnetic force portion 350 arranged inside the driving portion 340, the driving portion 340 may perform rising movement while performing rotational movement.

Accordingly, rise and fall of the driving portion 340 enable smooth, natural, and precise movement, and accordingly, reduce irregular intermittence of rise and fall of the expression member 310 and facilitate control of flexible movement and precise movement.

The expression member 310 may easily implement an on or off state of the information output apparatus 1000 by performing the rise and fall.

In addition, even in the case where a force applied to the driving portion 340 is removed through support, e.g., support for the first movement area 345 and the second movement area 348 by the support portion 360, during rise and fall operations of the driving portion 340, the state thereof may be maintained.

In other words, after rising from a stat in which the first movement area 345 is supported by an extension portion of the driving portion 340 to a state in which the second movement area 348 is supported by the extension portion, due to the magnetic field by the coil portion 320, the driving portion 340 may maintain the state in which the second movement area 348 supported by the extension portion even in the case where a power source connected to the coil portion 320 is removed or a current or voltage is removed.

In addition, after falling from the state in which the second movement area 348 is supported by the extension portion to the state in which the first movement area 345 is supported by the extension portion, due to a magnetic field through the coil portion 320 in an opposite direction, the driving portion 340 may maintain the state in which the first movement area 345 is supported by the extension portion even in the case where the power source connected to the coil portion 320 is removed or the current or voltage is removed.

Accordingly, on and off states of the expression member 310 of the information output unit 300 may be easily switched and maintained, power consumption for movement of the expression member 310 may be reduced, and the entire energy efficiency of the information output apparatus 1000 may be improved.

In addition, the driving controller 349 provided in the driving portion 340 of the present embodiment may be eccentric with the central axis of the driving portion 340, and accordingly, torque may be easily generated in the driving portion 340 to implement the rise and fall through the rotational movement of the driving portion 340 and thus control precise, smooth, and natural movement of the expression member 310.

As an optional embodiment, the magnetic force portion 350 provided in the driving portion 340 may be arranged to overlap the driving controller 349, e.g., a center of the magnetic force portion 350 and the driving controller 349 may overlap each other.

Accordingly, a change in a location of the magnetic force portion 350 may be reduced when the driving portion 340 rotates on the basis of the driving controller 349, e.g., a gap between the coil portion 320 and the magnetic force portion 350 may be maintained the same or similar.

As a result, unevenness of an effect of the magnetic field through the coil unit 320 on the magnetic force portion 350 may be reduced, and precise control of the movement of the driving portion 340 may be facilitated.

Figure 7:
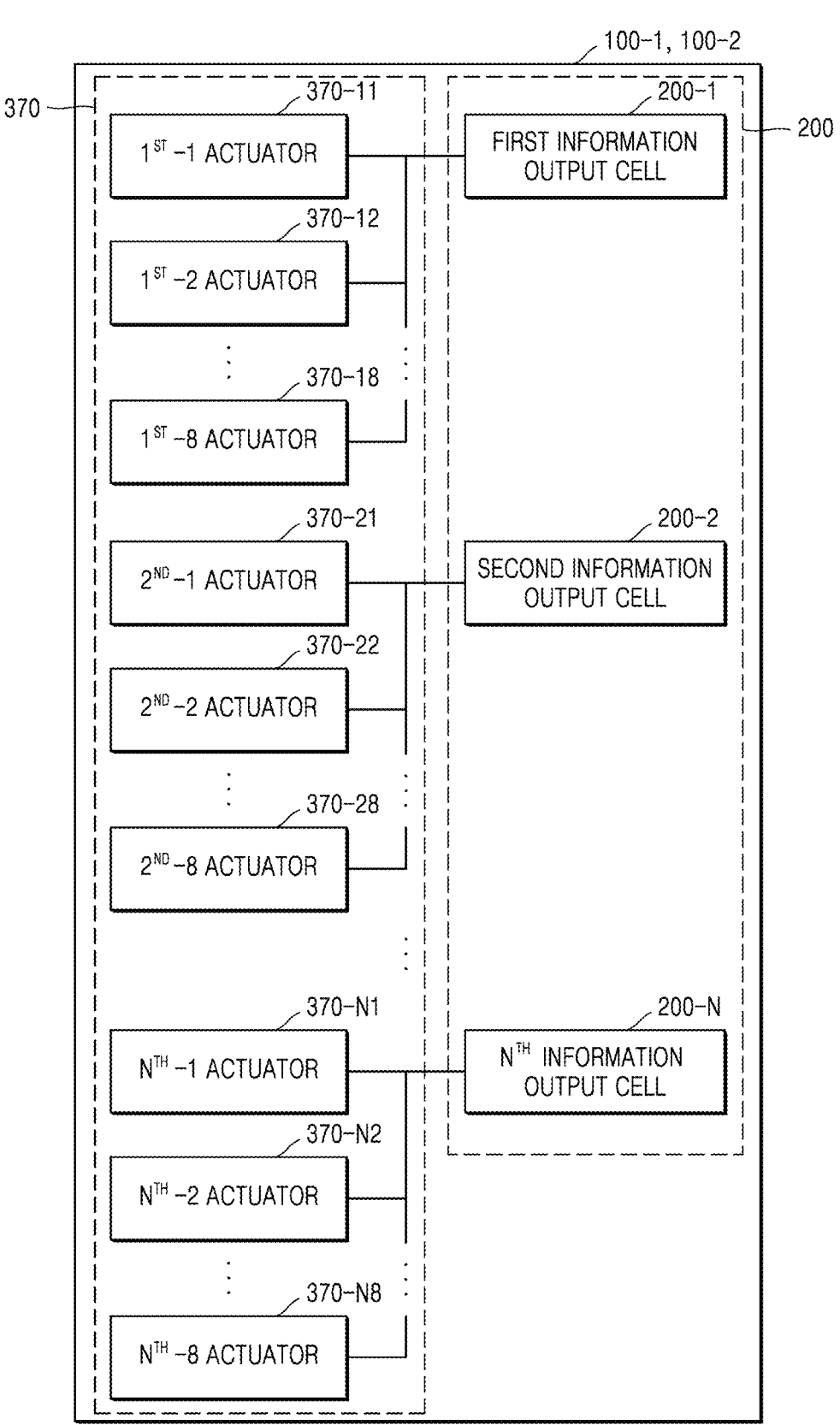
FIGS. 7 and 8 are diagrams schematically illustrating components of first and second information output portions of FIG. 6.
Figure 8:
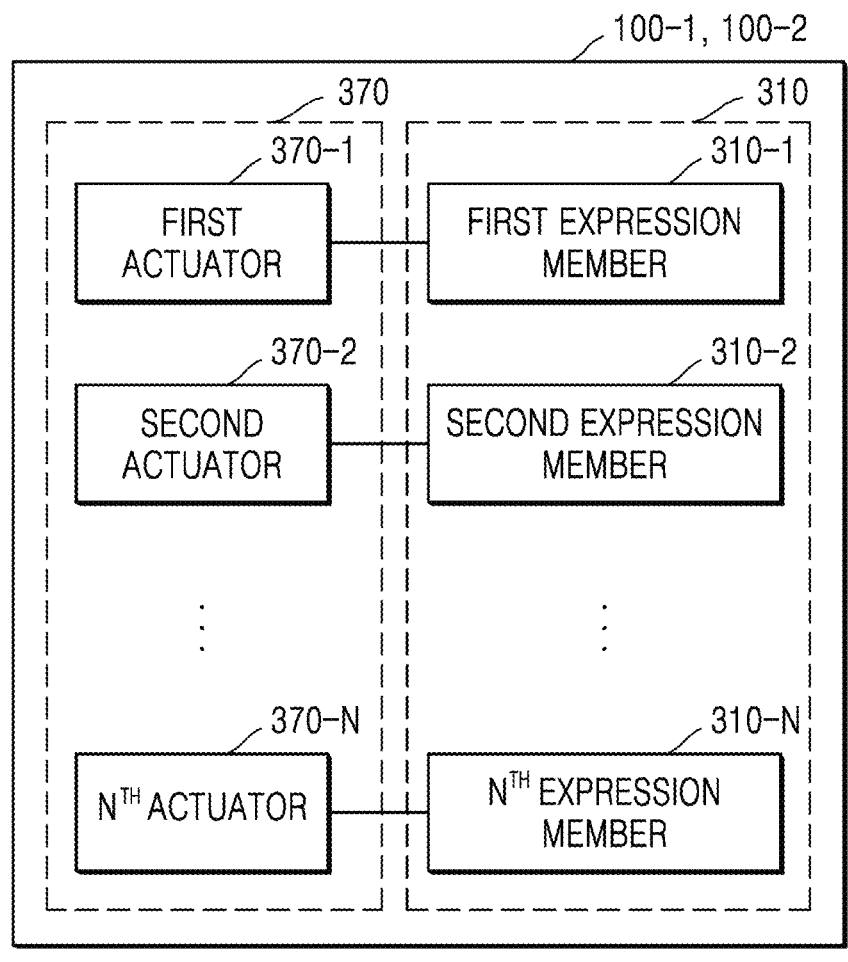

In the present embodiment, the coil portion 320, the base portion 330, the driving portion 340, the magnetic force portion 350, and the support portion 360 excluding the expression member 310 from among the information output unit 300 may be referred to as an actuator 370 of FIGS. 7 and 8.

The actuator 370 may move and protrude or depress the expression member 310 in at least one direction by a driving signal generated by a processor 920 of FIG. 9 described below. Here, the driving signal may be in the form of a pulse wave, a driving signal in the form of a + pulse wave may be transmitted to the actuator 370 to move the expression member 310 upwards, and a driving signal in the form of a − pulse wave may be transmitted to the actuator 370 to move the expression member 310 downwards.

In the present embodiment, Braille information that is output to the first and second information output portions 100-1 and 100-2 may be driven in units of the information output cells 200. Driving signals may be simultaneously transmitted to eight actuators 370 that respectively drive eight information output units 300 to enable the information output cell 200 to output the Braille information.

Figure 6:
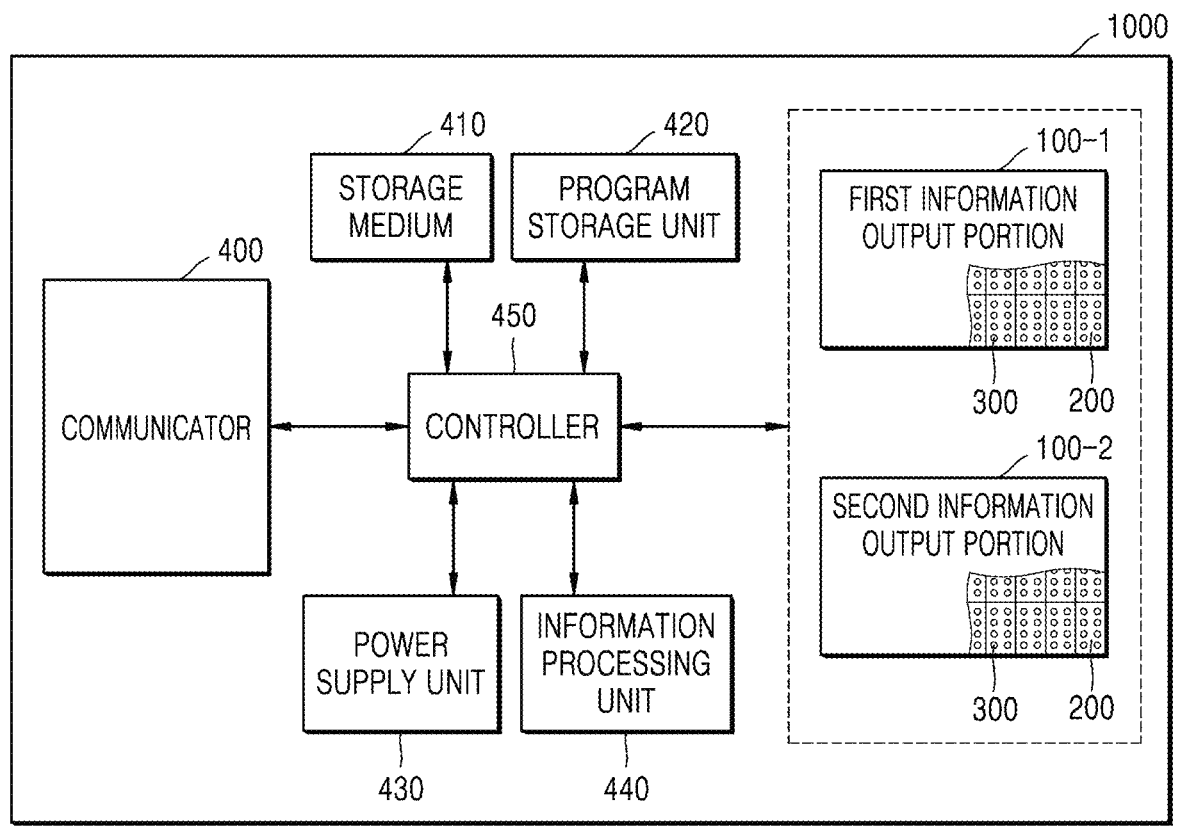
FIG. 6 is a diagram schematically illustrating components of an information output apparatus according to the present embodiment.

FIG. 6 is a diagram schematically illustrating components of an information output apparatus according to the present embodiment, and FIGS. 7 and 8 are diagrams schematically illustrating components of first and second information output portions of FIG. 6. In the following description, the description of the same portion as the description of FIGS. 1 to 5 is omitted.

Referring to FIGS. 6 to 8, an information output apparatus 1000 may include first and second information output portions 100-1 and 100-2 including information output cells 200 and information output units 300, a communicator 400, a storage medium 410, a program storage unit 420, a power supply unit 430, an information processing unit 440, and a controller 450.

In addition, in the present embodiment, a "portion" may be a hardware component such as a processor or a circuit, and/or a software component executed by a hardware component such as a processor.

The information output portion 100 may drive the information output unit 300 included in the information output cell 200 to perform upward movement or downward movement on the basis of a driving signal according to a scheduling plan transmitted from the information processing unit 440 to enable a user to sense the same by tactile sensation.

FIG. 7 is a diagram schematically illustrating components of a first or second information output portion 100-1 or 100-2, according to an embodiment and illustrates an example of driving, in units of information output cells 200, Braille information that are to be output to the first information output portion 100-1 and the second information output portion 100-2.

Referring to FIG. 7, the information output portion 100 may include N information output cells 200, and each information output cell may include eight actuators 370. The present disclosure is not limited thereto, and each information output cell may include six actuators 370. Alternatively, each information output cell may include four actuators 370.

From FIG. 7, in the case where a $1^{st}$-1 actuator 370-11 to a $1^{st}$-8 actuator 370-18 are connected to a first information output cell 200-1 and in the case where the first information output cell 200-1 is to be driven, eight driving signals may be simultaneously applied to the $1^{st}$-1 actuator 370-11 to the $1^{st}$-8 actuator 370-18, respectively. Here, the eight driving signals may be one of a + pulse voltage and a − pulse voltage.

From FIG. 7, in the case where a $2^{nd}$-1 actuator 370-21 to a $2^{nd}$-8 actuator 370-28 are connected to s second information output cell 200-2 and in the case where the second information output cell 200-2 is to be driven, eight driving signals may be simultaneously applied to the $2^{nd}$-1 actuator 370-21 to the $2^{nd}$-8 actuator 370-28, respectively. Here, the eight driving signals may be one of a + pulse voltage and a − pulse voltage.

FIG. 8 is a diagram schematically illustrating components of a first or second information output portion 100-1 or 100-2, according to another embodiment. FIG. 8 illustrates an example of driving, in units of information output units 300, Braille information that are to be output to the first information output portion 100-1 and the second information output portion 100-2.

From FIG. 8, the first information output portion 100-1 and the second information output portion 100-2 may include N expression members 310 and N actuators 370.

From FIG. 8, a first actuator 370-1 may be connected to a first expression member 310-1, a second actuator 370-2 may be connected to a second expression member 310-2, and an N$^{th}$ actuator 370-N may be connected to an N$^{th}$ expression member 310-N.

Accordingly, in the case where the first expression member 310-1 is allowed to perform upward movement or downward movement, a driving signal may be applied to the first actuator 370-1, in the case where the second expression member 310-2 is allowed to perform upward movement or downward movement, a driving signal may be applied to the second actuator 370-2, and in the case where the N$^{th}$ expression member 310-N is allowed to perform upward movement or downward movement, a driving signal may be applied to the N$^{th}$ actuator 370-N.

Returning to FIG. 6, the communicator 400 may be provided to be linked to a network (not shown) and transmit a signal between an external apparatus (e.g., an information provision system, a server, or another information output apparatus (not shown)) and the information output apparatus 1000, and may provide a communication interface needed to provide the transmitted and received signal in the form of packet data. In addition, the communicator 400 may serve to receive a certain information request signal from the information output apparatus 1000, and may serve to transmit information processed by the information output apparatus 1000 to the outside. Here, the network is a medium that serves to connect the external apparatus and the information output apparatus 1000, and may include a path that provides a connection path so that the information output apparatus 1000 may connect to the external apparatus and then transmit and receive data.

In the present embodiment, the network may include wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto. In addition, the network may transmit and receive information by using short-range communication and/or long-range communication. Here, the short-range communication may include Bluetooth, radio frequency identification (RFID), infrared data association (IrDA), ultra-wideband (UWB), ZigBee, and wireless fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network may include connections of network elements such as a hub, a bridge, a router, and a switch. The network may include one or more connected networks including a public network such as the Internet and a private network such as a secure corporate private network, e.g., a multi-network environment. Access to the network may be provided via one or more wired or wireless access networks. In addition, the network may support Internet of Things (IoT) networks and/or 5G communication that exchange and process information between distributed components 20 such as objects.

The storage medium 410 may perform a function of temporarily or permanently storing information processed by the controller 450 and/or information received from the outside through the communicator 400. Here, the storage medium 410 may include magnetic storage media or flash storage media, but the scope of the present disclosure is not limited thereto. The storage medium 410 may include an internal memory and/or an external memory, and may include a volatile memory such as DRAM, SRAM, or SDRAM, a nonvolatile memory such as one time programmable ROM (OTPROM), PROM, EPROM, EEPROM, mask ROM, flash ROM, NAND flash memory, or NOR flash memory, a flash drive such as an SSD, a compact flash (CF) card, an SD card, a Micro-SD card, a Mini-SD card, an Xd card, or a memory stick, or a storage device such as an HDD.

The program storage unit 420 may include control software that performs a task of detecting one or more of an image and a text from content being input, a task of generating a first driving signal for driving the first information output portion 100-1 according to the result of detecting the image and transmitting the first driving signal to the first information output portion 100-1, a task of generating a second driving signal for driving the second information output portion 100-2 according to the result of detecting the text and transmitting the second driving signal to the second information output portion 100-2, and the like.

In addition, the program storage unit 420 may include control software that performs a task of selecting a plurality of information output cells to be driven according to information to be output to the first and second information output portions 100-1 and 100-2, a task of generating a scheduling plan designating a driving order for the plurality of selected information output cells, a task of generating a driving signal according to the scheduling plan and transmitting the driving signal to the information output cells, a task of determining a power operation mode of the information output apparatus 1000, a task of determining an information output mode according to a type of information to be output to the first and second information output portions 100-1 and 100-2, a task of converting information regarding the information output mode into Braille information and outputting the result of converting into the Braille information, a task of selecting a plurality of information output units to be driven according to information to be output to the first and second information output portions 100-1 and 100-2, a task of generating a scheduling plan designating a driving order for the plurality of selected information output units, a task of generating a driving signal according to the scheduling plan and transmitting the driving signal to the information output units, and the like.

The power supply unit 430 may, under control of the controller 450, receive external power and internal power and supply power to respective components of the information output apparatus 1000. The power supply unit 430 may operate in a first power mode that operates the information output apparatus 1000 by alternating current power. Also, the power supply unit 430 may operate in a second power mode that operates the information output apparatus 1000 by direct current power from a battery.

Here, the battery may be configured as an internal battery or a replaceable battery. The battery may be charged by a wired or wireless charging method, and the wireless charging method may include a magnetic induction method or a magnetic resonance method. In the present embodiment, the battery may include a rechargeable secondary battery such as a nickel-cadmium battery, a lead-acid battery, a nickel metal hydride (NiMH) battery, a lithium-ion battery, or a lithium polymer battery, but is not limited thereto.

The information processing unit 440 may process information received from the outside through the communicator 400, information stored in the storage medium 410, and/or self-generated information (e.g., text message information created on the information output apparatus 1000) to be output to the first and second information output portions 100-1 and 100-2. In the present embodiment, information may include content and/or Braille information, and the content may include a still image such as a photo, a cartoon, and a picture, a moving image, and a series of text.

The information processing unit 440 may detect one or more of an image and a text from content being input, generate a first driving signal for driving the first information output portion 100-1 according to the result of the detecting the image, and transmit the driving signal to the first information output portion 100-1. The information processing unit 440 may generate a second driving signal for driving the second information output portion 100-2 according to the result of detecting the text and transmit the driving signal to the second information output portion 100-2.

In addition, the information processing unit 440 may determine a power operation mode of the information output apparatus 1000 and on the basis of the power operation mode, generate a scheduling plan that designates a driving order of two or more Braille cells that may be simultaneously driven, from among a plurality of cells selected by a selector.

The information processing unit 440 may determine an information output mode according to a type of information to be output to the information output portion 100, convert information regarding the information output mode into Braille information, and output the result of converting into the Braille information. The information processing unit 440 may select, with respect to the result of converting text information into Braille, a first cell group corresponding to a plurality of cells to be driven as an active area and a second cell group corresponding to a plurality of cells to be driven as an inactive area. The information processing unit 440 may generate a scheduling plan to sequentially and primarily drive respective cells within the first cell group and sequentially and secondarily drive respective cells within the second cell group as the primary driving is completed.

The information processing unit 440 described above generates driving signals in units of information output cells 200 and transmits the driving signals to the information output cells 200, but as another embodiment, the information processing unit 440 may generate driving signals in units of information output units 300 and transmit the driving signals to the information output units 300. To this end, the information processing unit 440 may select a plurality of information output units 300 to be driven according to information to be output to the first and second information output portions 100-1 and 100-2. The information processing unit 440 may generate a scheduling plan that designates a driving order for the plurality of selected information output units 300. The information processing unit 440 may generate a driving signal according to the scheduling plan and transmit the driving signal to the information output units 300.

The controller 450 is a type of central processing unit, and may control the entire process of connecting to the program storage unit 420 to process information and outputting the result of processing the information to the information output apparatus 1000 in the case where the information output apparatus 1000 receives an information request signal by connecting to an external apparatus or generates the information internally.

In the present embodiment, the controller 450 may include any type of device capable of processing any information, such as a processor. Here, the "processor" may refer, for example, to a data processing unit built in hardware, which has a circuit physically structured to perform a function expressed by a code or command included in a program. An example of the data processing unit built in the hardware as described above may include a processing unit such as a microprocessor, a central processing unit (CPU), a processor core, a multiprocessor, an application-specific integrated circuit (ASIC), or a field programmable gate array (FPGA), but the scope of the present disclosure is not limited thereto.

Figure 9:
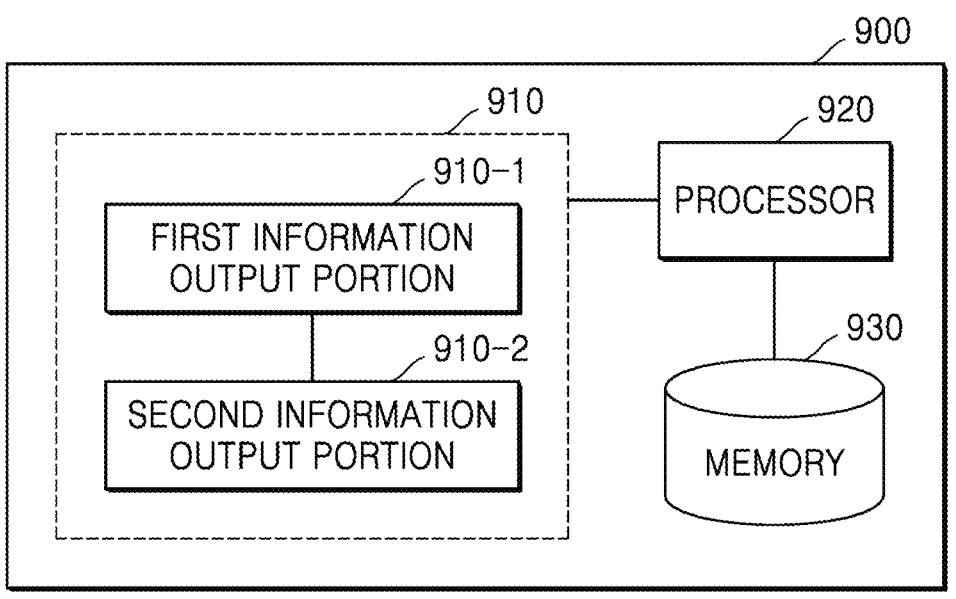
FIG. 9 is a diagram illustrating an example of other components of an information output apparatus according to the present embodiment.

FIG. 9 is a diagram illustrating an example of other components of an information output apparatus according to the present embodiment.

Referring to FIG. 9, an information output apparatus 900 may include an information output portion 910, a processor 920, and a memory 930. The information output portion 910 may include a first information output portion 910-1 and a second information output portion 910-2. Here, the first and second information output portions 910-1 and 910-2 may correspond to the first and second information output portions 100-1 and 100-2 of FIG. 6, the memory 930 may correspond to the storage medium 410 of FIG. 6, and the processor 920 may include the information processing unit 440 and controller 450 of FIG. 6.

The first information output portion 910-1 may include first information output cells that include a preset number of first information output units formed to enable tactilely sensing in the event of upward movement or downward movement in at least one direction and are arranged in a grid structure. The first information output portion 910-1 may be formed, for example, in a polygonal or elliptical shape.

The second information output portion 910-2 may be provided at a different location from the first information output portion 910-1 and include second information output cells that include a preset number of second information output units and are arranged in a grid structure. The second information output portion 910-2 may be formed, for example, in a polygonal shape (e.g., a rectangular shape), or may be formed in a polygonal or elliptical shape (e.g., a tube) including a hole. In the case where the second information output portion 910-2 has a polygonal shape or elliptical shape including a hole, the first information output portion 910-1 may arranged inside the hole.

In the present embodiment, a size of the first information output portion 910-1 may be configured to be greater than a size of the second information output portion 910-2.

In an embodiment, the second information output portion 910-2 may be spaced apart from the first information output portion 910-1 by a set interval and be provided in a horizontal direction or a vertical direction. For example, the second information output portion 910-2 may include a horizontal information output portion provided in the horizontal direction under the first information output portion 910-1 and a vertical information output portion provided in the vertical direction on the right side of the first information output portion 910-1.

The processor 920 may receive as an input, for example, content acquired by a camera module (not shown) included within the information output apparatus 900 or content transmitted from an external terminal (e.g., a smartphone), and detect one or more of an image and a text from the input content. Here, the processor 920 may detect, for example, the text from the content by using an optical character reader (OCR) method. An OCR is a technology that reads text from content such as a photo, and may indicate converting the text within the content into a format such as a character code that may be edited by a computer. More particularly, the OCR is a method of including text detection for detecting a text area and text recognition for recognizing text in the detected area, and extracting the text within the content through the same.

The text detected from the content may be information associated with the image detected from the content (e.g., naming information naming a key subject within the image, a famous sentence associated with the key subject, or the like), but is not limited thereto, and may include information that is not associated with the image.

The processor 920 may generate a first driving signal for driving a first information output unit according to the result of detecting the image and transmit the driving signal to the first information output portion 910-1 and thus enables the image to be output from the first information output portion 910-1 and enables the image to be intuitively recognized through tactile sensation.

Here, the processor 920 may perform image processing (e.g., semantic rendering processing, binarized image generation) on the image detected from the content and generate a first driving signal on the basis of the result of performing the image processing.

The processor 920 may partition the image into one or more of a background and a key subject through semantic rendering processing on the image, and generate a sub-image including the key subject and a feature of the key subject. Here, the key subject may be, for example, a person. In addition, the feature of the key subject may be information that distinguishes an outline, face, eyebrows, hair, forehead, or the like of the person.

As an example of generating a driving signal for the first information output unit, the processor 920 may generate, on the basis of the key subject detected from the sub-image (or the image detected from the content), a matching image for an output of the key subject by displaying a flag in at least one unit cell from among unit cells of a set size, generate a driving signal for the first information output unit on the basis of the matching image, and transmit the driving signal to the first information output portion 910-1.

In detail, the processor 920 may partition the sub-image (or the image detected from the content) into equal square areas of a set size and generate the matching image for the output of the key subject on the basis of the square areas corresponding to the key subject detected from the sub-image. Here, the processor 920 may provide a guide image for outputting the key subject to the first information output portion 910-1 by displaying a flag in unit cells that match, on a one-to-one basis, the square areas corresponding to the key subject within the sub-image, from among a unit area formed of unit cells of a set size to generate the matching image for the output of the key subject. Here, coordinate information of the unit cells may match coordinate information of a first information output cell on a one-to-one basis while matching, on a one-to-one basis, coordinate information of the square areas partitioned in the sub-image. Here, the unit cells within the unit area may match the square areas partitioned in the sub-image on a one-to-one basis, but are not limited thereto, and may match on a one-to-many basis (1: n, n is a natural number) or on a many-to-one basis (n:1). For example, one unit cell may match four square areas. The number n of square areas matching one unit cell may be set to a particular number in advance, or may be set on the basis of a size of the sub-image (or the number of pixels, a size of the key subject).

The processor 920 may generate a driving signal for the first information output unit on the basis of a flag displayed in the matching image for the key subject and transmit the same to the first information output portion 910-1. In other words, the processor 920 may check, in the matching image, the coordinate information of the unit cells in which the flag is displayed in relation to the key subject and detect, from first matching information stored in the memory 930, the coordinate information of the first information output cell corresponding to the coordinate information of the unit cells. The processor 920 may generate a driving signal for first information output units in response to the coordinate information of the first information output cell and transmit the driving signal for the first information output units to the first information output portion 910-1.

In an embodiment, the processor 920 may detect, from the memory 930, any one reference key subject having a similarity of a reference value or more to the key subject of the image (a reference key subject corresponding to the key subject of the image) and generate, from the reference key subject, a matching image for an output of the reference key subject. Here, the processor 920 may generate the matching image for the output of the reference key subject by generating an image including the reference key subject, partitioning the image into equal square areas of a set size, and then, from among a unit area formed of unit cells of a set size, displaying a flag in unit cells that match, on a one-to-one basis, square areas corresponding to the reference key subject. Here, the processor 920 may generate an image having a size matching (or proportional to) a unit area of the matching image by including a set value (e.g., "0") other than an area of the reference key subject. In addition, the coordinate information of the unit cell may match, on a one-to-one basis, coordinate information of the square areas partitioned in the image including the reference key subject and may match the coordinate information of the first information output cell on a one-to-one basis.

The processor 920 may generate a driving signal for a first information output unit on the basis of the matching image for the output of the reference key subject and transmit the driving signal to the first information output portion 910-1. In other words, the processor 920 may check, in the matching image, coordinate information of unit cells in which a flag is display in relation to the reference key subject and detect, from the first matching information stored in the memory 930, the coordinate information of the first information output cell corresponding to the coordinate information of the unit cells. The processor 920 may clearly display, on the first information output portion 910-1, the image detected from the content by using a structured reference key subject even in the case where the image detected from the content is distorted or partially unclear by generating a driving signal for first information output units in response to the coordinate information of the first information output cell and transmitting the driving signal for the first information output units to the first information output portion 910-1.

In another embodiment, the processor 920 may detect, from the memory 930, the matching image for the output of the reference key subject having a similarity of a reference value or more to the key subject of the image. The processor 920 may omit a process of generating the matching image from the reference key subject to quickly process an output of the image by generating a driving signal for a first information output unit on the basis of the matching image for the output of the reference key subject pre-stored in the memory 930 and transmitting the driving signal to the first information output portion 910-1.

In addition, as another example of generating the driving signal for the first information output unit, the processor 920 may process the sub-image to correspond to the coordinate information of the first information output cell, generate the driving signal for the first information output unit in response to the coordinate information, and transmit the driving signal to the first information output portion 910-1. In an embodiment, the processor 920 may generate a binarized image (a black and white image) for the sub-image by processing a portion indicating the feature of the key subject (or the key subject and the feature of the key subject) as a first value (e.g., "1") and processing a portion excluded from the feature as a second value (e.g., "0"), and then process the binarized image to correspond to the coordinate information of the first information output cell. Here, on the basis of a preset binarization threshold value, the processor 920 may generate the binarized image from the sub-image by processing a pixel of the portion indicating the feature of the key subject as the first value and processing a pixel of the portion excluded from the feature as the second value. The binarization threshold value, which is a reference for binarization, may be adjusted by the size of the key subject, brightness of the sub-image, or the like.

As a method for allowing the binarized image to correspond to the coordinate information of the first information output cell, first, the processor 920 may output the binarized image in a virtual display area which is partitioned into a plurality of grid cells and in which one grid cell matches one first information output cell on a one-to-one basis.

The processor 920 may detect coordinate information of a first information output cell corresponding to coordinate information of a grid cell in which the binarized image is output, generate a driving signal for a first information output unit corresponding to the coordinate information of the first information output cell, and transmit the driving signal to the first information output portion 910-1. Here, the processor 920 may acquire, from the memory 930, second matching information including a one-to-one correspondence between coordinate information of a plurality of grid cells included in the virtual display area and the coordinate information of the first information output cell and detect, from the second matching information, coordinate information of a first information output cell corresponding to coordinate information of a grid cell in which the binarized image is output.

As another example, the processor 920 may detect, from the memory 930, any one reference key subject having a similarity of a reference value or more to the key subject of the image (a reference key subject corresponding to the key subject of the image), generate a reference binarized image from the reference key subject, and process the reference binarized image to correspond to the coordinate information of the first information output cell.

As another example, the processor 920 may detect, from the memory 930, a reference binarized image for the reference key subject having the similarity of the reference value or more to the key subject of the image and process the reference binarized image to correspond to the coordinate information of the first information output cell.

As another example, the processor 920 may perform image processing on the image detected from the content to partition the image into one or more of a background and a key subject. The processor 920 may differently generate, for each of the background and the key subject, a driving signal for a first information output unit. The processor 920 may generate a $1^{st}$-1 driving signal that causes a first information output unit corresponding to the background to be depressed and transmit the $1^{st}$-1 driving signal to the first information output portion 910-1. The processor 920 may generate a 151-2 driving signal that causes a first information output unit corresponding to the key subject of the image to protrude and transmit the $1^{st}$-2 driving signal to the first information output portion 910-1. Accordingly, a user may intuitively recognize the key subject simply by touching the first information output portion 910-1.

In addition, the processor 920 enables the text associated with the image, which is output from the first information output portion 910-1, to be recognized through tactile sensation by generating a second driving signal for driving a second information output unit according to the result of detecting the text from the content and transmitting the second driving signal to the second information output portion 910-2 to allow the text to be output to the second information output portion 910-2. Here, the processor 920 may convert the text into Braille on the basis of a Braille table stored in the memory 930, generate a driving signal for a second information output unit corresponding to the Braille, and transmit the driving signal to the second information output portion 910-2.

As another example, the processor 920 may detect, from the memory 930, the text naming the reference key subject corresponding to the key subject of the image detected from the content, convert the text into Braille, generate the driving signal for the second information output unit corresponding to the Braille, and transmit the driving signal to the second information output portion 910-2. Even in the case where only the image is included in the content and the text is not included, the processor 920 allows information regarding the image (e.g., a name of a person, a brand name, and the like) to be accurately recognized by acquiring, from the memory 930, the text associated with the image and providing the text.

Here, the processor 920 compares two pieces of text in the case where the text is detected from the content together with the image and the text naming the reference key subject is detected from the memory 930 and in the case where the two pieces of text are different as the result of the comparison and allows both the two pieces of text to be output to the second information output portion 910-2 or allows any one piece of the text to be output to the second information output portion 910-2 on the basis of a size of the second information output portion 910-2 (or selection by the user).

In an embodiment, in the case where determining that a preset condition is satisfied, the processor 920 may change output locations of the image and the text by generating a first driving signal according to the result of detecting the text, transmitting the driving signal to the first information output portion 910-1, generating a second driving signal according to the result of detecting the image, and transmitting the driving signal to the second information output portion 910-2. In the case where the number of Braille characters converted from the text exceeds the maximum number of Braille characters output to the second information output portion 910-2 (or the set number of Braille characters) and the image may be output from the second information output portion 910-2, the processor 920 may determine that the condition is satisfied. The case where the image may be output from the second information output portion 910-2 may indicate that the number of cases where a size of the second information output portion 910-2 is greater than a size of the key subject within the image (or a case where the binarized image for the key subject may be output in the virtual display area including a plurality of grid cells that match, on a one-to-one basis, an information output cell within the second information output portion 910-2) is greater than the number of pixels included in the key subject. Here, the processor 920 may adjust (reduce, enlarge) the size (or an aspect ratio) of the key subject within the image and determine, on the basis of the adjusted size of the key subject, whether or not the image may be output from the second information output portion 910-2.

In an embodiment, a plurality of second information output portions 910-2 may be provided. In the case where a plurality of second information output portions 910-2 are provided, at least one of the plurality of second information output portions 910-2 may be selected on the basis of a preset priority, and a driving signal for driving an information output unit included in the selected information output portion according to the result of detecting the text may be generated and transmitted to the selected information output portion.

In the case where the second information output portion 910-2 includes a horizontal information output portion and a vertical information output portion and a priority of the horizontal information output portion is higher than a priority of the vertical information output portion, the processor 920 may select the horizontal information output portion, generate a driving signal for driving an information output unit included in the horizontal information output portion according to the result of detecting the text, and transmit the driving signal to the horizontal information output portion. Here, in the case where the number of Braille characters converted from the text exceeds the maximum number of Braille characters output from the horizontal information output portion (e.g., the number of characters that may be simultaneously displayed) (or the set number of Braille characters), the processor 920 may select both the horizontal information output portion and the vertical information output portion.

In the case where both the horizontal information output portion and the vertical information output portion are selected, the processor 920 may minimize a movement line for hand movement of the user for Braille reading by adjusting a Braille reading direction (a Braille output direction) in any one information output portion of the horizontal information output portion and the vertical information output portion. For example, the processor 920 may adjust the driving signal transmitted to the horizontal information output portion to change the Braille reading direction for the text in the horizontal information output portion on the basis of the Braille reading direction for the text in the vertical information output portion. A detailed example thereof is described below with reference to FIG. 10.

In an embodiment, the processor 920 may be linked to a request for additional information regarding the image to receive the additional information regarding the image from an external server (or a terminal), generate a second driving signal for driving a second information output unit according to the result of detecting text from the additional information, and transmit the second driving signal to the second information output portion 910-2. Here, in the case where a plurality of second information output portions 910-2 (e.g., the horizontal information output portion and the vertical information output portion) are included, the processor 920 may cause one second information output portion (e.g., the horizontal information output portion) to display the Braille characters converted from the text detected from the content and cause another one second information output portion (e.g., the vertical information output portion) to display the Braille characters converted from the text detected from the additional information. For example, in the case where the key subject of the image detected from the content is a face of a person A and the text detected from the content is the person A (a name of the person), the additional information regarding the image may be, for example, personal information regarding the person A (a body size, education, family, and the like). In addition, in the case where the key subject of the image detected from the content is in the form of a product B and the text detected from the content is a name of the product B, the additional information regarding the image may be, for example, sales information regarding the product B (a store, a location of the store, a price, a review, and the like).

The processor 920 may allow the user to intuitively recognize the image through tactile sensation and simultaneously check detailed information regarding the image by providing the additional information regarding the image through an information output portion together with the image detected from the content and the text associated with the image.

Also, in another embodiment, in the case where the second information output portion 910-2 is provided in a polygonal or elliptical shape including a hole, the processor 920 may generate a second driving signal to allow Braille for text to be output from the second information output portion 910-2 in a preset Braille reading direction (e.g., clockwise, counterclockwise) from a preset point (e.g., from a point in a 12 o'clock direction).

The memory 930 may store the reference key subject and the text naming the reference key subject. The memory 930 may further store the reference binarized image for the reference key subject.

The memory 930 may further store the first matching information including one-to-one matching among the unit area of the matching image, the coordinate information of the unit cells within the unit area, and the coordinate information of the first information output cells. Here, the one-to-one matching may indicate that, under the premise that the number of unit cells and the number of first information output cells are the same, the coordinate information of the unit cells (relative locations in the unit area) and the coordinate information of the first information output cells (relative locations in the first information output portion 910-1) are the same.

The memory 930 may further store the second matching information including one-to-one matching among the virtual display area, the coordinate information of the plurality of grid cells included in the virtual display area, and the coordinate information of the first information output cell. Here, the one-to-one matching may indicate that, under the premise that the number of grid cells and the number of first information output cells are the same, the coordinate information of the grid cells (relative locations in the virtual display area) and the coordinate information of the first information output cell (a relative location in the first information output portion) are the same.

In addition, the memory 930 may further store the Braille table. The Braille table may include, for example, Braille characters for Braille, which include abbreviations (articles, . . . , but, therefore, and so, etc.), numbers (1, 2, 3, . . . , 0), signs (?, !, +, . . . ), the English alphabet (A, B, C, . . . Z), or the like.

Figure 10:
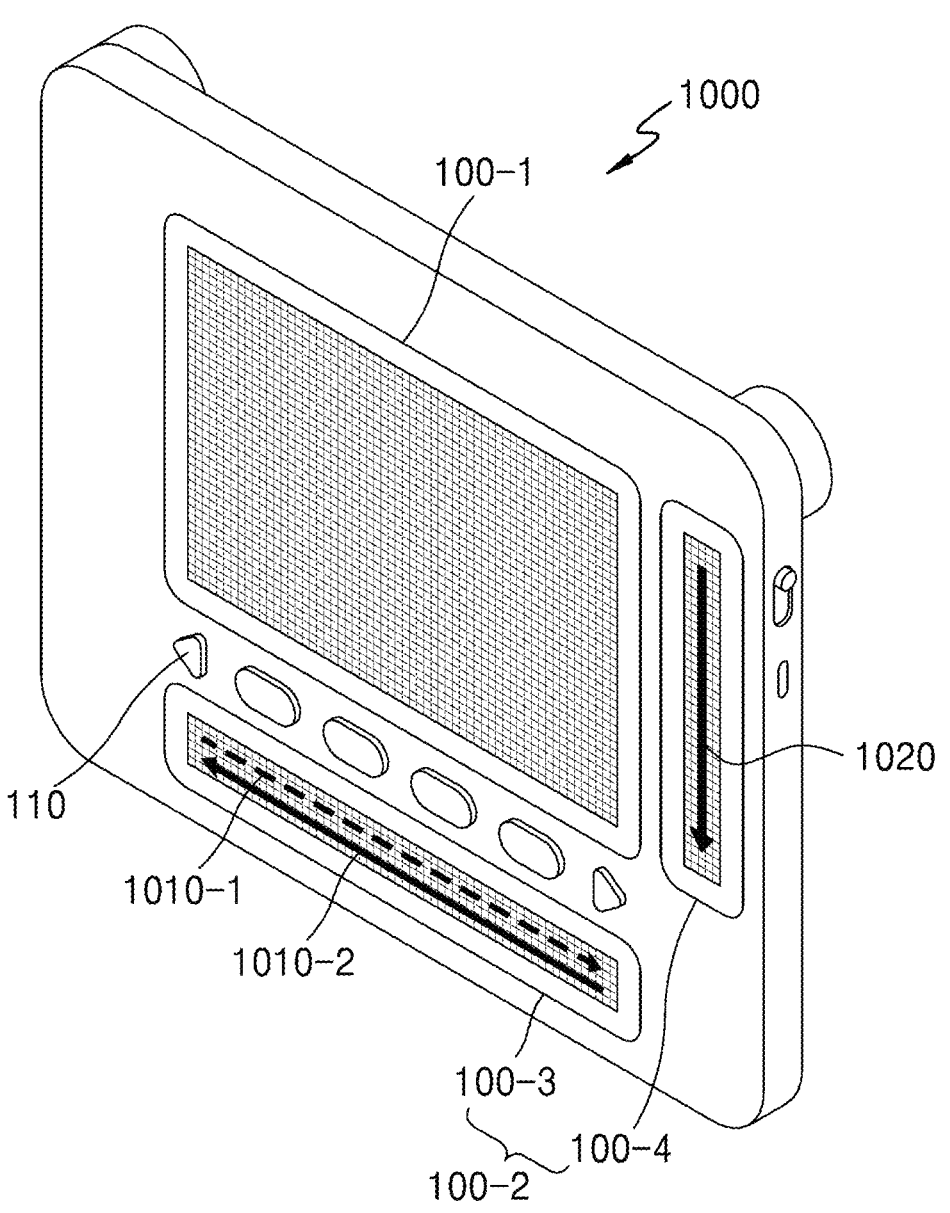
FIG. 10 is a view illustrating another example of the appearance of an information output apparatus according to the present embodiment.

FIG. 10 is a view illustrating another example of the appearance of an information output apparatus according to the present embodiment. In the following description, the description of the same portion as the description of FIGS. 1 and 9 is omitted.

Referring to FIG. 10, an information output apparatus 1000 may include a first information output portion 100-1, a second information output portion 100-2, and a plurality of user interfaces 110.

The first information output portion 100-1 may be provided, for example, in a rectangular shape, but is not limited thereto.

The second information output portion 100-2 may include a horizontal information output portion 100-3 and a vertical information output portion 100-4. The horizontal information output portion 100-3 and the vertical information output portion 100-4 may also be provided in a rectangular shape, but are not limited thereto.

The horizontal information output portion 100-3 may be spaced apart from the first information output portion 100-1 by a set interval thereunder and may be provided in a horizontal direction. The vertical information output portion 100-4 may be spaced apart from the first information output portion 100-1 by a set interval on the right side thereof and may be provided in a vertical direction.

A processor of the information output apparatus 1000 may select at least one information output portion from among the horizontal information output portion 100-3 and the vertical information output portion 100-4 on the basis of a preset priority, generate a driving signal for driving an information output unit included in the selected information output portion according to the result of detecting text, and transmit the driving signal to the selected information output portion. For example, in the case where a priority of the vertical information output portion 100-4 is higher than a priority of the horizontal information output portion 100-3, the processor may select the vertical information output portion 100-4, generate a driving signal for driving an information output unit included in the vertical information output portion 100-4 according to the result of detecting the text, and transmit the driving signal to the vertical information output portion 100-4.

In an embodiment, in the case where the number of Braille characters converted from the text exceeds the maximum number of Braille characters that are output from the horizontal information output portion 100-3 (e.g., the number of characters that may be simultaneously displayed) (or the set number of Braille characters), the processor of the information output apparatus 1000 may select both the horizontal information output portion 100-3 and the vertical information output portion 100-4.

In the case where both the horizontal information output portion 100-3 and the vertical information output portion 100-4 are selected, the processor of the information output apparatus 1000 may adjust the driving signal transmitted to the horizontal information output portion 100-3 to change a Braille reading direction for the text in the horizontal information output portion 100-3 on the basis of a Braille reading direction for the text in the vertical information output portion 100-4. For example, in the case where the Braille reading direction in the vertical information output portion 100-4 provided on the right side on the basis of the first information output portion 100-1 is from top to bottom 1020 and the Braille reading direction in the horizontal information output portion 100-3 provided at a lower end on the basis of the first information output portion 100-1 is from left to right 1010-1, the processor may adjust the driving signal transmitted to the horizontal information output portion 100-3 to allow the Braille reading direction in the horizontal information output portion 100-3 to be changed from right to left 1010-2. The processor may minimize a movement line for hand movement of a user for Braille reading by allowing the Braille reading direction in the horizontal information output portion 100-3 to be changed to reduce a distance between a last Braille character (a last Braille character to be read) in the vertical information output portion 100-4 and a first Braille character (a first Braille character to be read) in the horizontal information output portion 100-3.

Figure 11:
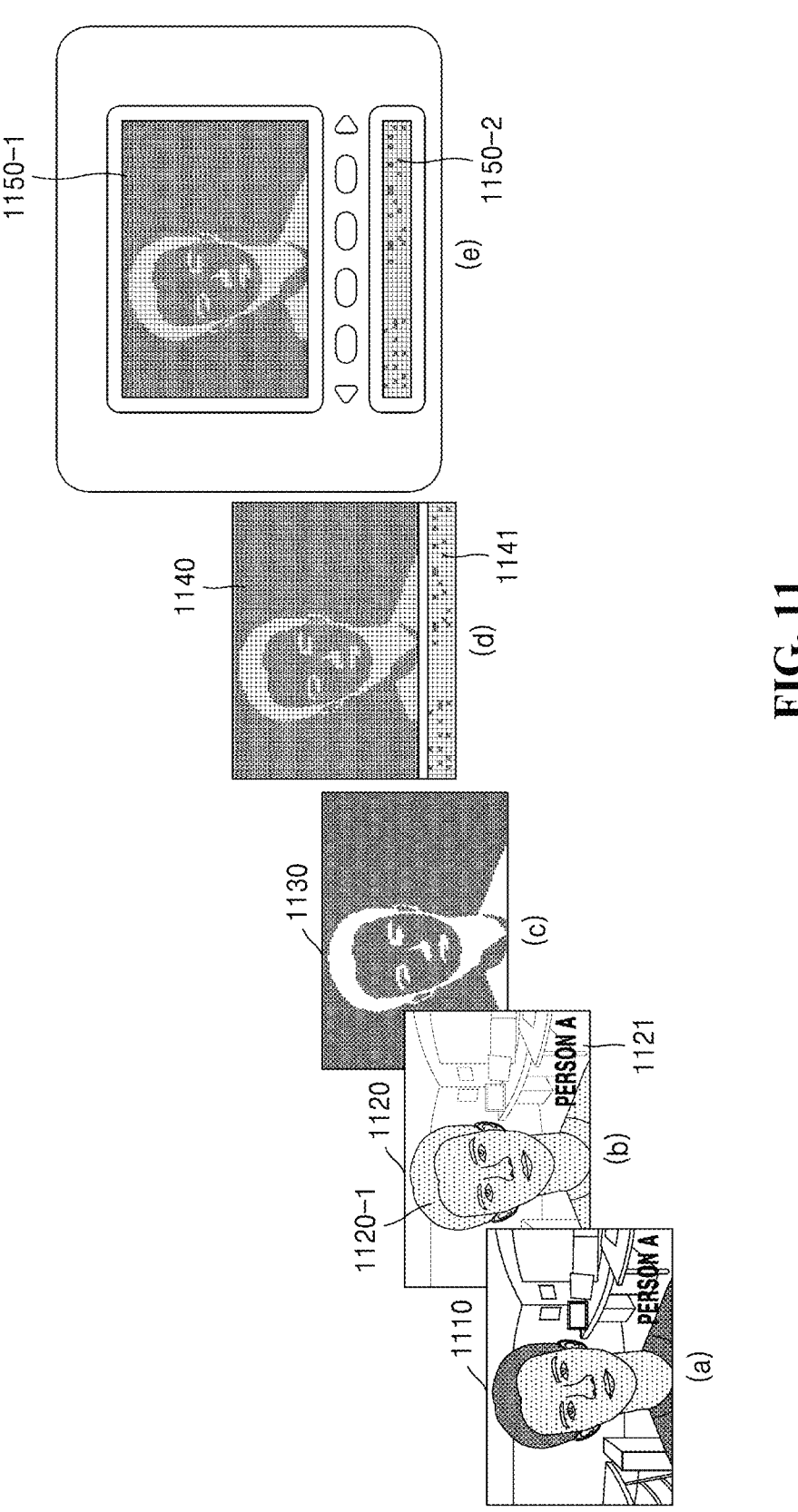
FIG. 11 is a view illustrating an example of image processing in an information output apparatus according to the present embodiment.

FIG. 11 is a view illustrating an example of image processing in an information output apparatus according to the present embodiment.

Referring to FIG. 11, in an embodiment, a processor of an information output apparatus may receive content 1110 as an input (a), and detect an image 1120 (an image including a face of a person A) and text 1121 (the person A) from the content 1110 (b). Here, the processor simplifies, for example, a color and contrast of the image through gray scale and then facilitates extraction of a key subject 1120-1 (the face of the person A).

The processor may partition the image 1120 into one or more of a background and the key subject 1120-1 through semantic rendering processing on the image 1120 and generate a sub-image including the key subject 1120-1 and a feature of the key subject 1120-1. In an embodiment, the processor may extract the key subject 1120-1 from which the background is removed, by applying a background removal algorithm pre-trained to remove the background from the image 1120 or may extract the key subject 1120-1 by applying a subject extraction algorithm pre-trained to extract a subject form the image 1120. Here, a type of the background removal algorithm or the subject extraction algorithm may include, for example, a gaussian mixture model (GMM), an adaptive mixture of gaussians (MOG), and the like.

The processor may generate a binarized image 1130 by processing a portion indicating a feature of the key subject 1120-1 as a first value (e.g., "1", white) and processing a portion excluded from the feature as a second value (e.g., "0", black) with respect to the sub-image (c). The processor may output the binarized image 1130 in a virtual display area 1140 (d). The virtual display area 1140 may be partitioned into a plurality of grid cells. One grid cell may match, on a one-to-one basis, one first information output cell included in a first information output portion 1150-1. Here, the processor may adjust (or reduce or enlarge) a size (an aspect ratio) of the binarized image 1130 so that the binarized image 1130 is optimized on the basis of a size of the virtual display area 1140.

The processor may detect coordinate information of a first information output cell corresponding to coordinate information of a grid cell in which the binarized image 1130 is output, generate a driving signal for a first information output unit corresponding to the coordinate information of the first information output cell, and transmit the driving signal to the first information output portion 1150-1 (c).

In addition, the processor may convert the text 1121 (the person A) detected from the content 110 into Braille characters (1141) (d), generate a driving signal for a second information output unit corresponding to the Braille characters 1141, and transmit the driving signal to a second information output portion 1150-2 (c).

The processor enables a name referring to the key subject 1120-1 to be easily sensed together with a shape (or an outline) of the key subject 1120-1 (e.g., a face shape of the person A) within the image 1120 through tactile sensation by processing the image 1120 (the image including the face of the person A) detected from the content 1110 and the text 1121 (the person A) to be output to the first information output portion 1150-1 and the second information output portion 1150-2.

Figure 12:
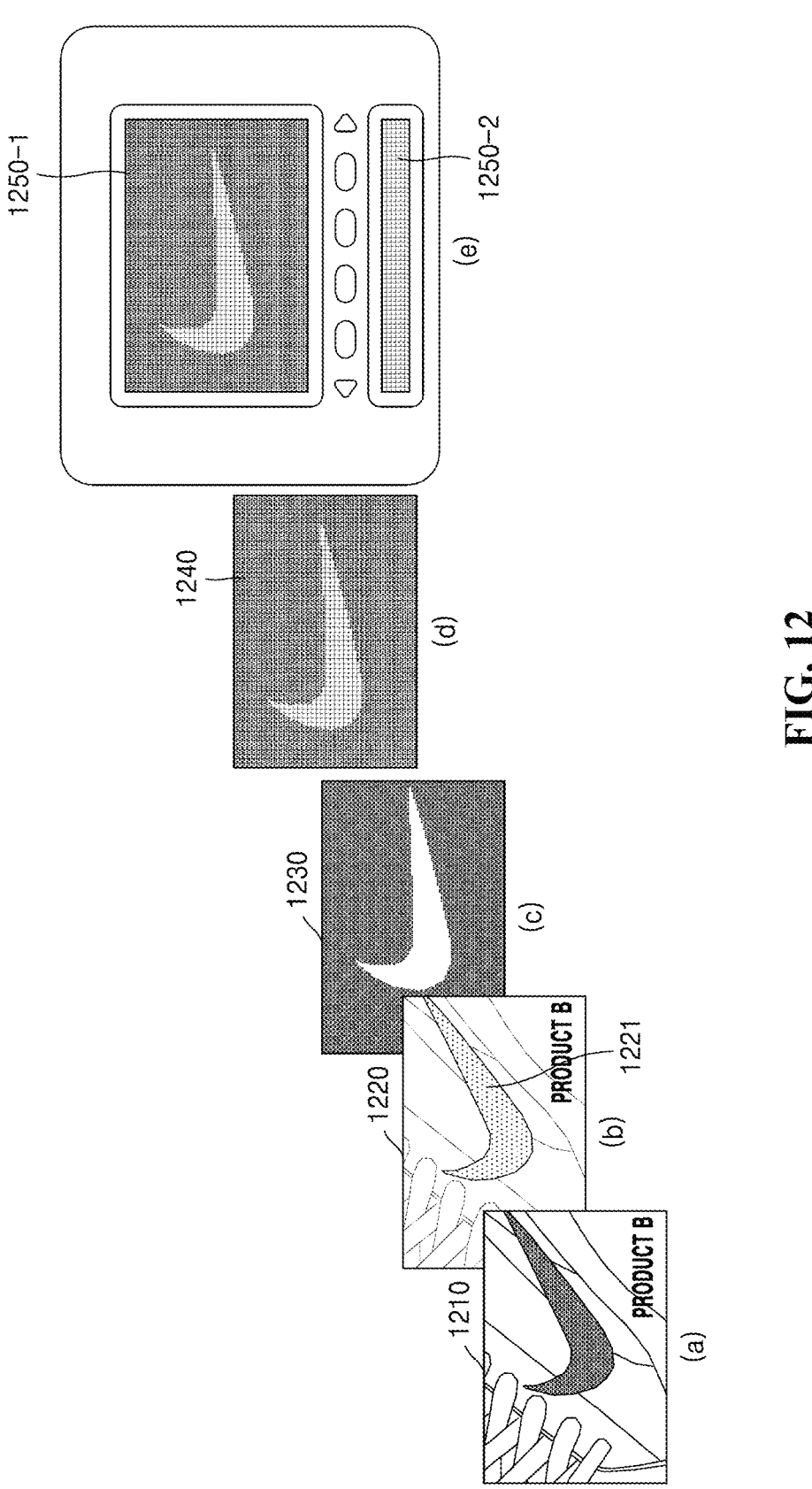
FIG. 12 is a view illustrating another example of image processing in an information output apparatus according to the present embodiment.

FIG. 12 is a view illustrating another example of image processing in an information output apparatus according to the present embodiment. In the following description, the description of the same portion as the description of FIG. 11 is omitted.

Referring to FIG. 12, in an embodiment, a processor of an information output apparatus may receive content 1210 as an input (a) and detect an image 1220 from the content 1210 (b).

The processor may detect, from a memory, a reference key subject corresponding to a key subject 1221 (a brand logo) of the image 1220 (an image including the brand logo), generate a reference binarized image 1230 from the reference key subject, and output the same in a virtual display area 1240. The virtual display area 1240 may be partitioned into a plurality of grid cells, and one grid cell may match one first information output cell on a one-to-one basis.

Alternatively, the reference binarized image 1230, and/or the virtual display area 1240 partitioned into the grid cells may be generated in advance in correspondence to the reference key subject stored in the memory and then stored in the memory. Accordingly, in the case where the processor completes a task of matching the detected key subject 1221 with the reference key subject stored in the memory, the processor may retrieve, from the memory, the reference binarized image 1230 corresponding to the reference key subject and/or the virtual display area 1240 partitioned into the grid cells.

The processor may detect coordinate information of a first information output cell corresponding to coordinate information of a grid cell in which the reference binarized image 1230 is output, generate a driving signal for a first information output unit corresponding to the coordinate information of the first information output cell, and transmit the driving signal to a first information output portion.

The processor may detect, from the memory, text (a brand N) naming the reference key subject (a reference brand logo) corresponding to the key subject 1221 (the brand logo) of the image 1220, convert the text into Braille characters, generate a driving signal for a second information output unit corresponding to the Braille characters, transmit the driving signal to a second information output portion 1250-2.

In an embodiment, the processor may allow information regarding the image 1220 (e.g., a brand name indicated by the brand logo) to be easily recognized and the image 1220 to be identified even in the case where text associated with the image 1220 is not included in the content 1210, by processing the text (e.g., the brand N) associated with the image 1220 and outputting the same to the second information output portion 1250-2 while processing the image 1220 detected from the content 1210 (the image including the brand logo) and outputting the same to a first information output portion 1250-1.

Figure 13:
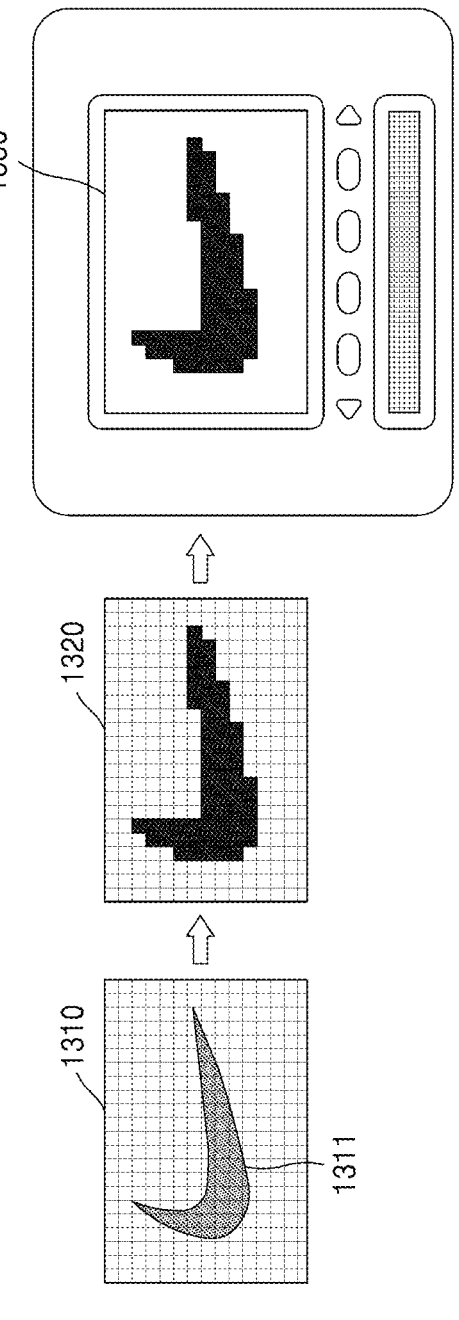
FIG. 13 is a view illustrating another example of image processing in an information output apparatus according to the present embodiment.

FIG. 13 is a view illustrating another example of image processing in an information output apparatus according to the present embodiment.

Referring to FIG. 13, a processor of an information output apparatus may generate, on the basis of a key subject detected in an image, a matching image for an output of the key subject by displaying a flag in at least one unit cell from among unit cells of a set size, generate a driving signal for a first information output unit on the basis of the matching image, and transmit the driving signal to a first information output portion.

For example, the processor may partition an image 1310 into equal square areas of a set size and generate a matching image 1320 for an output of a key subject 1311 on the basis of the square areas corresponding to the key subject 1311 (a brand logo) within the image 1310. The processor may generate the matching image 1320 for the output of the key subject 1311 by displaying a flag in unit cells that match, on a one-to-one basis, square areas corresponding to the key subject 1311 within the image 1310, from among a unit area formed of unit cells of a set size. Here, coordinate information of the unit cells may match, on a one-to-one basis, coordinate information of a first information output cell of the information output apparatus while matching, on a one-to-one basis, coordinate information of the square areas partitioned in the image 1310. Also, the flag may be a set particular form or a set value (e.g., "1").

In an embodiment, the processor may set the matching between the square areas and the unit cells to many-to-one matching (or one-to-many matching) on the basis of the number of square areas partitioned in the key subject 1311 in the image 1310 or a size of the key subject 1311 (the number of pixels) and generate the matching image 1320 for the output of the key subject 1311 on the basis of the set matching. For example, in the case where the number of square areas partitioned in the key subject 1311 in the image 1310 is greater than or equal to a set number or a size of the key subject 1311 (the number of pixels) is greater than or equal to a set size, the processor may reduce the key subject 1311 by setting the one-to-one matching between the square areas and the unit cells to a many-to-one matching (e.g., 4:1).

The processor may check coordinate information of the unit cells in which the flag is displayed in relation to the key subject 1311 in the matching image 1320 for the key subject 1311, and detect, from first matching information stored in a memory, the coordinate information of the first information output cell corresponding to the coordinate information of the unit cells. The processor enables the key subject 1311 within the image 1310 to be displayed in a first information output portion 1330 by generating a driving signal for first information output units in response to the coordinate information of the first information output cell and transmitting the driving signal to the first information output portion 1330.

Figure 14:
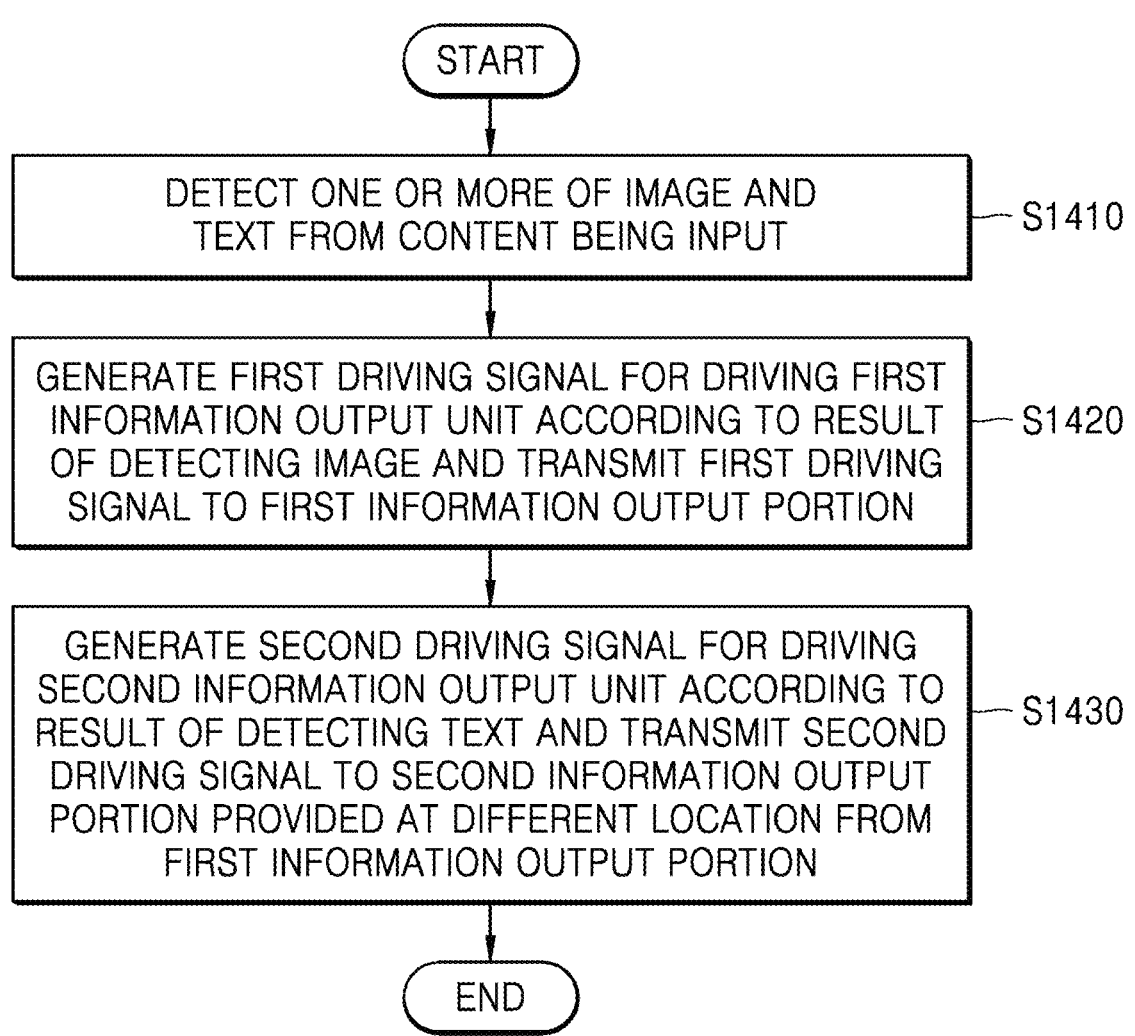
FIG. 14 is a flowchart illustrating an information output method according to the present embodiment.

FIG. 14 is a flowchart illustrating an information output method according to the present embodiment. In the following description, the description of the same portion as the description of FIGS. 1 to 12 is omitted. The information output method may be performed by an information output apparatus according to the present embodiment.

Referring to FIG. 14, in operation S1410, the information output apparatus may detect one or more of an image and a text from content being input. Content acquired by a camera module included inside the information output apparatus or content transmitted from an external terminal (e.g., a smartphone) may be received as an input.

In operation S1420, the information output apparatus may allow the image to be displayed in a first information output portion to allow a shape (or an outline) of a key subject within the image to be intuitively recognized through tactile sensation by generating a first driving signal for driving a first information output unit according to the result of detecting the image and transmitting the first driving signal to the first information output portion. The first information output portion may include a first information output cell that includes a preset number of first information output units formed to tactilely sense in the event of upward movement or downward movement in at least one direction and is arranged in a grid structure.

In operation S1430, the information output apparatus may generate a second driving signal for driving a second information output unit according to the result of detecting the text and transmit the second driving signal to a second information output portion. The second information output portion may be provided at a different location from the first information output portion and include a second information output cell that includes a preset number of second information output units and is arranged in a grid structure.

In an embodiment, the information output apparatus allows the text to be displayed in the second information output portion, by converting the text detected from the content into Braille characters, generating a driving signal for a second information output unit corresponding to the Braille characters, and transmitting the driving signal to the second information output portion. The information output apparatus enables the text output from the second information output portion (e.g., a name indicating the key subject within the image) to be recognized through tactile sensation.

Figure 15:
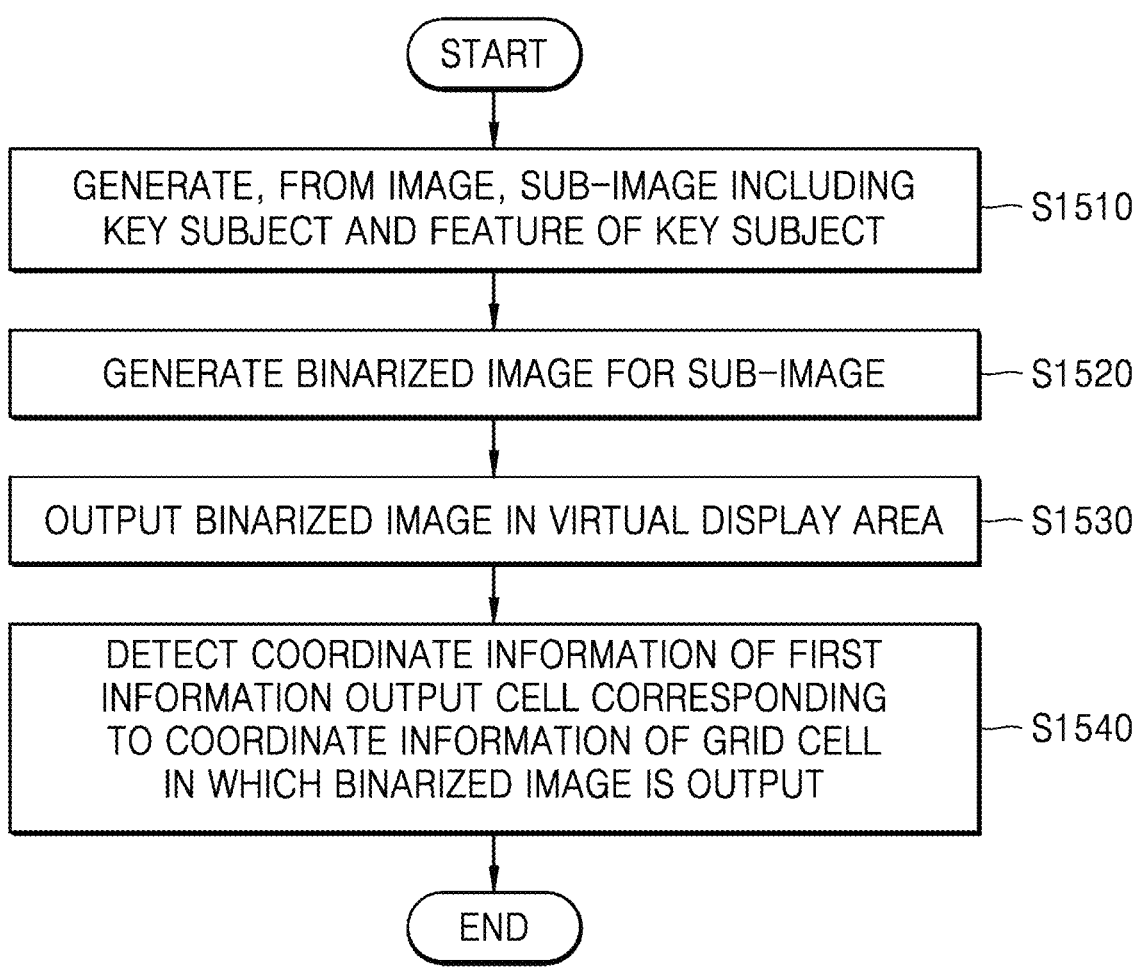
FIG. 15 is a flowchart illustrating an example of an image processing method in an information output apparatus, according to the present embodiment.

FIG. 15 is a flowchart illustrating an example of an image processing method in an information output apparatus, according to the present embodiment.

Referring to FIG. 15, in operation S1510, an information output apparatus may partition an image into one or more of a background and a key subject through semantic rendering processing on the image detected from content and generate a sub-image including the key subject and a feature of the key subject. Here, the key subject may be, for example, a person. In addition, the feature of the key subject may be information that distinguishes an outline, face, eyebrows, hair, and forehead of the person.

Hereinafter, through operations S1520 to S1540, the information output apparatus may process the sub-image to correspond to coordinate information of a first information output cell, generate a driving signal for a first information output unit in response to the coordinate information, and transmit the driving signal to a first information output portion.

In operation S1520, the information output apparatus may generate a binarized image for the sub-image. The information output apparatus may generate the binarized image (a black and white image) for the sub-image by processing a portion indicating the feature of the key subject as a first value (e.g., "1") and processing a portion excluded from the feature as a second value (e.g., "0"). Here, the information output apparatus may generate the binarized image from the sub-image by processing a pixel of the portion indicating the feature of the key subject as the first value and a pixel of the portion excluded from the feature as the second value on the basis of a preset binarization threshold value. The binarization threshold value, which is a reference for binarization, may be adjusted by a size of the key subject, brightness of the sub-image, or the like.

In operation S1530, the information output apparatus may process the binarized image to correspond to the coordinate information of the first information output cell. Here, the information output apparatus may output the binarized image in a virtual display area which is partitioned into a plurality of grid cells and in which one grid cell matches the first information output cell on a one-to-one basis.

In an embodiment, the information output apparatus may detect, from a memory, any one reference key subject having a similarity of a reference value or more to the key subject of the image (a reference key subject corresponding to the key subject of the image), generate a reference binarized image from the reference key subject, and process the reference binarized image to correspond to the coordinate information of the first information output cell. Here, the information output apparatus may output the reference binarized image in the virtual display area which is partitioned into the plurality of grid cells and in which one grid cell matches the first information output cell on a one-to-one basis.

In operation S1540, the information output apparatus enables the image output from the first information output portion to be recognized through tactile sensation by detecting, from second matching information stored in the memory, the coordinate information of the first information output cell corresponding to coordinate information of a grid cell in which the binarized image (or the reference binarized image) is output, generating a driving signal for a first information output unit corresponding to the coordinate information of the first information output cell, and transmitting the driving signal to the first information output portion.

In an embodiment, in the case where the reference key subject corresponding to the key subject of the image is detected from the memory, in operation S1430 of FIG. 14, the information output apparatus may detect text naming the reference key subject from the memory, convert the text into Braille characters, generate a driving signal for a second information output unit corresponding to the Braille characters, and transmit the driving signal to the second information output portion. The information output apparatus provides the text associated with the image to enable the image to be particularly recognized even in the case where only the image is detected from the content and the text is not detected, by acquiring, from the memory, the text naming the reference key subject and allowing the same to be output to the second information output portion.

Figure 16:
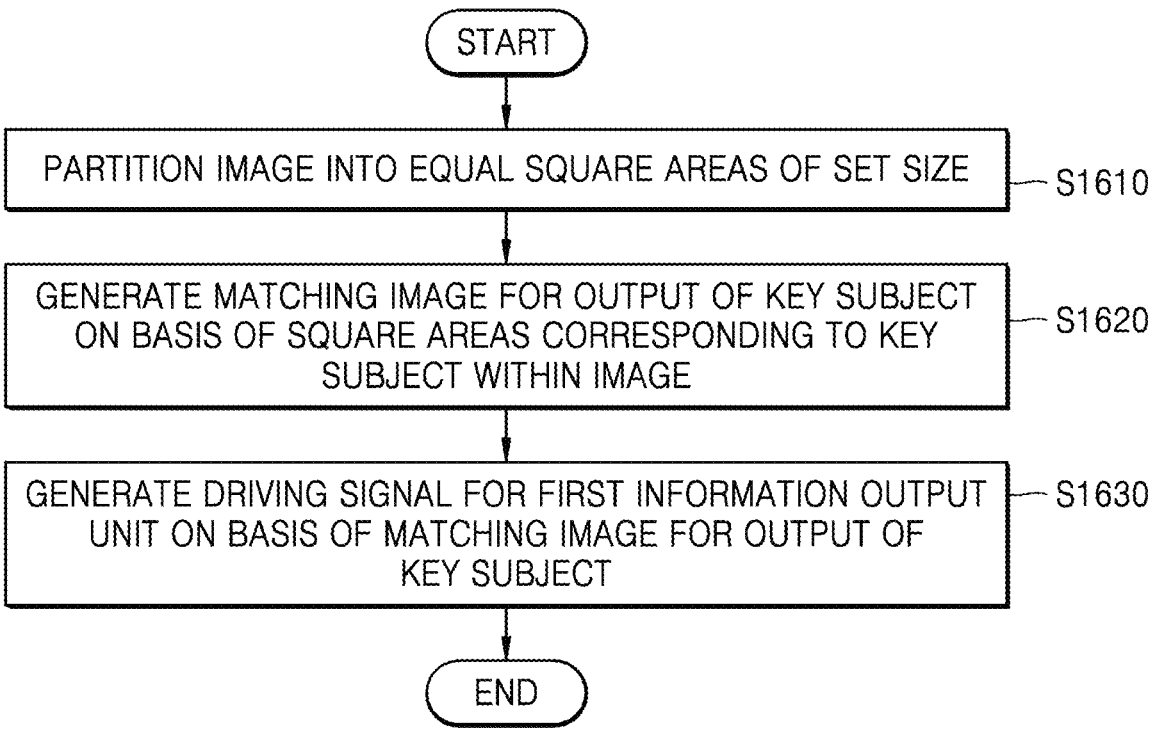
FIG. 16 is a flowchart illustrating another example of an image processing method in an information output apparatus, according to the present embodiment.

FIG. 16 is a flowchart illustrating another example of an image processing method in an information output apparatus, according to the present embodiment.

Referring to FIG. 16, in operation S1610, an information output apparatus may partition an image into equal square areas of a set size. Here, the image may be an image detected from content, a sub-image generated from the image to include a feature of a key subject, or a binarized image generated from the sub-image.

In operation S1620, the information output apparatus may generate a matching image for an output of the key subject on the basis of the square areas corresponding to the key subject within the image. The information output apparatus may generate the matching image for the output of the key subject by displaying a flag in unit cells that match, on a one-to-one basis, the square areas corresponding to the key subject within the image, from among a unit area formed of unit cells of a set size. Here, coordinate information of the unit cells may match, on a one-to-one basis, coordinate information of the square areas partitioned in the image and may match coordinate information of a first information output cell on a one-to-one basis.

In operation S1630, the information output apparatus may generate a driving signal for a first information output unit on the basis of the matching image for the output of the key subject and transmit the driving signal to a first information output portion. Here, the information output apparatus may check the coordinate information of the unit cells in which the flag is displayed in relation to the key subject in the matching image and detect, from first matching information stored in a memory, the coordinate information of the first information output cell corresponding to the coordinate information of the unit cells. The information output apparatus enables the key subject within the image to be displayed in the first information output portion by generating a driving signal for first information output units in response to the coordinate information of the first information output cell and transmitting the driving signal to the first information output units to the first information output portion.

The embodiments according to the present disclosure described above may be implemented in the form of a computer program that may be executed through various components on a computer, and the computer program may be recorded on a computer-readable medium. Here, the medium may include magnetic media such as a hard disk, a floppy disk, and a magnetic tape, optical recording media such as CD-ROM and DVD, a magneto-optical medium such as a floptical disk, and a hardware device particularly configured to store and execute program instructions, such as ROM, RAM, or flash memory.

Meanwhile, the computer program may be particularly designed and configured for the present disclosure or may be known and available to those skilled in the art in the computer software field. Examples of the computer program may include not only machine language code, such as that produced by a compiler, but also high-level language code that may be executed by a computer by using an interpreter or the like.

In the description of the present disclosure (particularly, in claims), the use of the term "the" and similar indicative terms may correspond to both singular and plural forms. In addition, in the case where a range is described in the present disclosure, it is considered to include the disclosure that applies individual values belonging to the range (unless otherwise stated), and is the same as describing the respective individual values constituting the range in the detailed description of the disclosure.

In the case where there is no explicit description or contrary description of the order of operations constituting a method according to the present disclosure, the operations may be performed in an appropriate order. The present disclosure is not necessarily limited to the order in which the operations are described. The use of all examples or example terms (e.g., and the like) in the present disclosure is merely intended to illustrate the present disclosure in detail and is not intended to limit the scope of the present disclosure by the examples or example terms, unless otherwise limited by claims. In addition, those skilled in the art may appreciate that various modifications, combinations, and changes may be configured according to design conditions and factors within the scope of the appended claims or equivalents thereof.

Therefore, the spirit of the present disclosure should not be defined by being limited to the above-described embodiments, and not only claims described below but also all scopes equivalent to or equivalently modified from claims will fall within the scope of the present disclosure.

The invention claimed is:

1. An apparatus for outputting information, the apparatus comprising:

a first information output portion comprising a first information output cell which is arranged in a grid structure and comprises a preset number of first information output units configured to tactilely sense in an event of upward movement or downward movement in at least one direction;

a second information output portion provided at a different location from the first information output portion and comprising a second information output cell which is arranged in a grid structure and comprises a preset number of second information output units; and a processor configured to detect one or more of an image and a text from content being input, generate a first driving signal driving the first information output unit according to a result of detecting the image, transmit the first driving signal to the first information output portion, generate a second driving signal driving the second information output unit according to a result of detecting the text, and transmit the second driving signal to the second information output portion.

2. The apparatus of claim 1, wherein the processor is further configured to partition the image into one or more of a background and a key subject, generate a sub-image comprising the key subject and a feature of the key subject, process the sub-image to correspond to coordinate information of the first information output cell, and generate a driving signal for a first information output unit in response to the coordinate information, and transmit the driving signal to the first information output portion.

3. The apparatus of claim 2, wherein the processor is further configured to generate a binarized image for the sub-image by processing a portion indicating the feature of the key subject as a first value and a portion excluded from the feature as a second value, and process the binarized image to correspond to the coordinate information of the first information output cell.

4. The apparatus of claim 1, wherein the processor is further configured to generate, on the basis of the key subject detected in the image, a matching image for an output of the key subject by displaying a flag in at least one unit cell from among unit cells of a set size, generate a driving signal for the first information output unit on the basis of the flag displayed in the matching image, and transmit the driving signal to the first information output portion.

5. The apparatus of claim 4, further comprising a memory storing a reference key subject and a text naming the reference key subject, wherein the processor is further configured to detect, from the memory, any one reference key subject having a similarity of a reference value or more to the reference key subject, generate a matching image for an output of the reference key subject from the reference key subject, generate a driving signal for the first information output unit on the basis of the matching image, and transmit the driving signal to the first information output portion.

6. The apparatus of claim 4, further comprising a memory storing a reference key subject, a matching image for an output of the reference key subject, and a text naming the reference key subject, wherein the processor is further configured to detect, from the memory, the matching image for the output of the reference key subject having a similarity of a reference value or more to the key subject, generate a driving signal for the first information output unit on the basis of the matching image, and transmit the driving signal to the first information output portion.

7. The apparatus of claim 5, wherein the processor is further configured to detect, from the memory, the text naming the reference key subject, convert the text into Braille characters, generate a driving signal for a second information output unit corresponding to the Braille characters, and transmit the driving signal to the second information output portion.

8. The apparatus of claim 1, wherein the processor is further configured to, in a case where a number of Braille characters converted from the text exceeds a maximum number of Braille characters output from the second information output portion and the image is capable of being output from the second information output portion, generate the first driving signal according to the result of detecting the text, transmit the first driving signal to the first information output portion, generate the second driving signal according to the result of detecting the image, and transmit the second driving signal to the second information output portion.

9. The apparatus of claim 1, wherein the processor is further configured to be linked to a request for additional information regarding the image to receive the additional information regarding the image from an external server, generate a second driving signal driving the second information output unit according to a result of detecting text from the additional information, and transmit the second driving signal to the second information output portion.

10. The apparatus of claim 1, wherein the second information output portion comprises a horizontal information output portion provided in a horizontal direction with respect to the first information output portion and a vertical information output portion provided in a vertical direction with respect to the first information output portion, wherein the processor is further configured to select at least one information output portion from among the horizontal information output portion and the vertical information output portion on the basis of a preset priority, generate a driving signal driving an information output unit included in the selected information output portion according to the result of detecting the text, and transmit the driving signal to the selected information output portion.

11. A method of outputting information, performed by a processor of an apparatus for outputting information, the method comprising:

detecting one or more of an image and a text from content being input;

generating a first driving signal driving a first information output unit according to a result of detecting the image and transmitting the first driving signal to a first information output portion; and generating a second driving signal driving a second information output unit according to a result of detecting the text and transmitting the second driving signal to a second information output portion, wherein the first information output portion comprises a first information output cell which is arranged in a grid structure and comprises a preset number of first information output units configured to tactilely sense in an event of upward movement or downward movement in at least one direction, and the second information output portion provided at a different location from the first information output portion and comprising a second information output cell which is arranged in a grid structure and comprises a preset number of second information output units.

12. The method of claim 11, wherein the generating the first driving signal and transmitting the first driving signal to the first information output portion comprises:

partitioning the image into one or more of a background and a key subject, and generating a sub-image comprising the key subject and a feature of the key subject;

processing the sub-image to correspond to coordinate information of the first information output cell; and generating a driving signal for a first information output unit in response to the coordinate information and transmitting the driving signal to the first information output portion.

13. The method of claim 12, wherein the processing to correspond to the coordinate information of the first information output cell comprises:

generating a binarized image for the sub-image by processing a portion indicating the feature of the key subject as a first value and processing a portion excluded from the feature as a second value; and processing the binarized image to correspond to the coordinate information of the first information output cell.

14. The method of claim 11, wherein the generating the first driving signal and transmitting the first driving signal to the first information output portion comprises:

on the basis of the key subject detected in the image, generating a matching image for an output of the key subject by displaying a flag in at least one unit cell from among unit cells of a set size; and generating a driving signal for the first information output unit on the basis of the flag displayed in the matching image and transmitting the driving signal to the first information output portion.

* * * * *